US012784418B2

(12) United States Patent
Suthar et al.

(10) Patent No.: US 12,784,418 B2
(45) Date of Patent: Nov. 3, 2026

(54) ABERRANT IMAGE SYNTHESIS VIA TRUNCATED REVERSE-DIFFUSION

(71) Applicant: GE Precision Healthcare LLC, Waukesha, WI (US)

(72) Inventors: Harsh Suthar, Bengaluru (IN); Pavan Annangi, Bengaluru (IN); Naveen Paluru, Bangalore (IN); Gopal Biligeri Avinash, Concord, CA (US)

(73) Assignee: GE Precision Healthcare LLC, Waukesha, WI (US)

( * ) Notice: Subject to any disclaimer, the term of this patent is extended or adjusted under 35 U.S.C. 154(b) by 126 days.

(21) Appl. No.: 18/762,280

(22) Filed: Jul. 2, 2024

(65) Prior Publication Data

US 2026/0011123 A1 Jan. 8, 2026

(51) Int. Cl.

| | |
|---|---|
| ***G06V 10/774*** | (2022.01) |
| ***G06T 5/50*** | (2006.01) |
| ***G06T 5/60*** | (2024.01) |
| ***G06T 5/70*** | (2024.01) |
| ***G06T 7/11*** | (2017.01) |
| ***G06T 11/00*** | (2026.01) |
| ***G06V 10/82*** | (2022.01) |

(52) U.S. Cl.

CPC .............. *G06V 10/774* (2022.01); *G06T 5/50* (2013.01); *G06T 5/60* (2024.01); *G06T 5/70* (2024.01); *G06T 7/11* (2017.01); *G06T 11/00* (2013.01); *G06V 10/82* (2022.01); *G06T 2207/20081* (2013.01); *G06T 2207/20084* (2013.01); *G06T 2207/20221* (2013.01); *G06T 2207/30052* (2013.01); *G06T 2207/30096* (2013.01); *G06T 2210/41* (2013.01)

(58) Field of Classification Search

CPC .... G06T 5/50; G06T 5/60; G06T 5/70; G06T 7/11; G06T 11/00; G06V 10/82

See application file for complete search history.

(56) References Cited

U.S. PATENT DOCUMENTS

2024/0355018 A1* 10/2024 Aggarwal .................. G06T 7/50
2024/0378704 A1* 11/2024 Gibson ...................... G06T 5/70

FOREIGN PATENT DOCUMENTS

KR 20250025432 A * 2/2025 ............... G06N 3/08
WO WO-2022238640 A1 * 11/2022 ............... G06T 7/11

OTHER PUBLICATIONS

Huangjie Zheng, "Truncated Diffusion Probabilistic Models and Diffusion-Based Adversarial Auto-Encoders" (Year: 2023).*

(Continued)

*Primary Examiner* — Daniel F Hajnik
*Assistant Examiner* — Joshua Jungwook Suo
(74) *Attorney, Agent, or Firm* — Amin, Turocy & Watson, LLP

(57) ABSTRACT

Systems/techniques that facilitate aberrant image synthesis via truncated reverse-diffusion are provided. In various embodiments, a system can access a scanned medical image depicting an anatomical structure of a medical patient. In various aspects, the system can generate, via a diffusion neural network executed in a truncated reverse-diffusion process beginning at an intermediate level of noise rather than full noise, a synthetic version of the scanned medical image, wherein the synthetic version of the scanned medical image can depict the anatomical structure exhibiting a foreign object.

20 Claims, 24 Drawing Sheets

(56) References Cited

OTHER PUBLICATIONS

EP application 25181720.1 filed Jun. 10, 2025—extended Search Report issued Jul. 18, 2025; 10 pages.
Lee Jae-Hun et al: "Diffusion Probabilistic Models-based Noise Reduction for Enhancing the Quality of Medical Images", 2023 32nd IEEE International Conference on Robot and Human Interactive Communication (RO-MAN), IEEE, Aug. 28, 2023 (Aug. 28, 2023), pp. 1661-1666, XP034467285, DOI: 10.1109/RO-MAN57019.2023.10309463 [retrieved on Nov. 13, 2023].

* cited by examiner

ABERRANT IMAGE SYNTHESIS VIA TRUNCATED REVERSE-DIFFUSION

TECHNICAL FIELD

The subject disclosure relates generally to medical image synthesis, and more specifically to aberrant image synthesis via truncated reverse-diffusion.

BACKGROUND

A deep learning neural network can be trained and subsequently deployed so as to perform an inferencing task on medical images produced by medical imaging scanners. In order to properly train the deep learning neural network, a voluminous amount of training data that is representative of the vast variety of anatomical structures that the deep learning neural network is likely to encounter during deployment can be warranted. In practice, most available training data depicts healthy or non-pathological anatomical structures. Unfortunately, such training data can cause the deep learning neural network to be unable to confidently or reliably perform the inferencing task on medical images that depict unhealthy or pathological anatomical structures.

Accordingly, systems or techniques that can address one or more of these technical problems can be desirable.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate aberrant image synthesis via truncated reverse-diffusion are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a scanned medical image depicting an anatomical structure of a medical patient. In various aspects, the computer-executable components can comprise a synthesis component that can generate, via a diffusion neural network executed in a truncated reverse-diffusion process beginning at an intermediate level of noise rather than full noise, a synthetic version of the scanned medical image, wherein the synthetic version of the scanned medical image can depict the anatomical structure exhibiting a foreign object.

According to one or more embodiments, a computer-implemented method is provided. In various embodiments, the computer-implemented method can comprise accessing, by a device operatively coupled to a processor, a scanned medical image depicting an anatomical structure of a medical patient. In various aspects, the computer-implemented method can comprise generating, by the device and via a diffusion neural network executed in a truncated reverse-diffusion process beginning at an intermediate level of noise rather than full noise, a synthetic version of the scanned medical image, wherein the synthetic version of the scanned medical image can depict the anatomical structure exhibiting a foreign object.

According to one or more embodiments, a computer program product for facilitating aberrant image synthesis via truncated reverse-diffusion is provided. In various embodiments, the computer program product can comprise a non-transitory computer-readable memory having program instructions embodied therewith. In various aspects, the program instructions can be executable by a processor to cause the processor to access a scanned medical image. In various instances, the program instructions can be executable by the processor to cause the processor to generate, via a diffusion neural network implemented in a truncated reverse-diffusion process, a pathological version of the scanned medical image. In various cases, the program instructions can be executable to cause the processor to train, on the pathological version of the scanned medical image, another neural network to perform an inferencing task.

DETAILED DESCRIPTION

Figure 1:
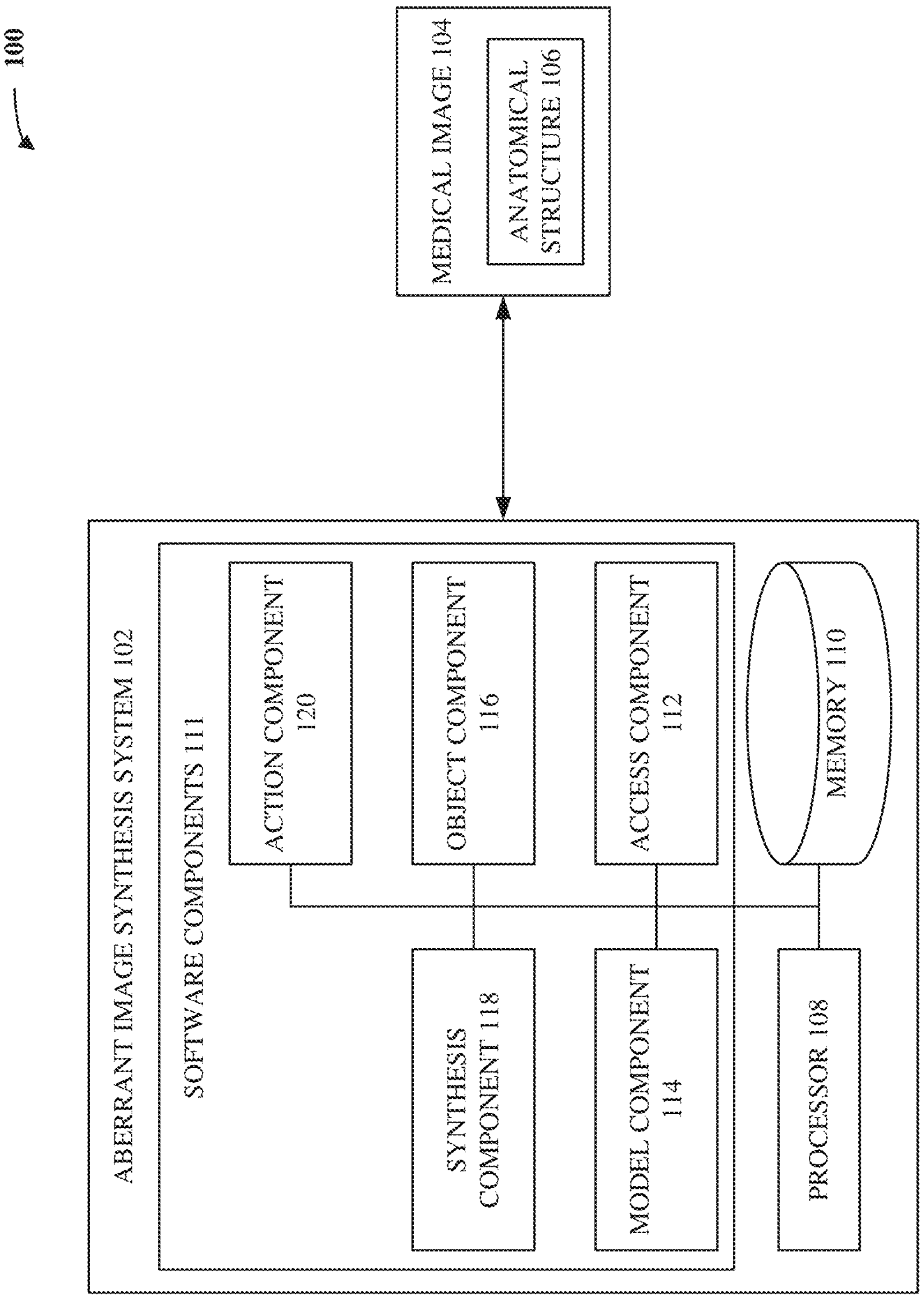
FIG. 1 illustrates a block diagram of an example, non-limiting system that facilitates aberrant image synthesis via truncated reverse-diffusion in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A deep learning neural network can be trained (e.g., via supervised training, unsupervised training, or reinforcement learning) and subsequently deployed so as to perform an inferencing task (e.g., classification, segmentation, regression) on medical images (e.g., pixel arrays or voxel arrays) produced by medical imaging scanners (e.g., computed tomography (CT) scanners, magnetic resonance imaging (MRI) scanners, X-ray scanners, ultrasound scanners, positron emission tomography (PET) scanners, nuclear medicine (NM) scanners).

In order to properly train the deep learning neural network, a voluminous amount of training data (e.g., annotated training medical images in the case of supervised training, unannotated training medical images in the case of unsupervised training) that is representative of the vast variety of anatomical structures that the deep learning neural network is likely to encounter during deployment can be warranted. In practice, most available training data depicts healthy or non-pathological anatomical structures (e.g., because different types of pathologies can be rare, it can be difficult to obtain voluminous amounts of training medical images that depict such pathologies). Unfortunately, such training data can cause the deep learning neural network to be unable to confidently or reliably perform the inferencing task on medical images that depict unhealthy or pathological anatomical structures.

As an example, suppose that the deep learning neural network is configured to perform resolution enhancement (which is a type of image-to-image regression task) on MRI images of lungs. In order for the deep learning neural network to learn how to confidently perform such image resolution enhancement, the deep learning neural network should be trained on MRI images that depict a wide variety of lungs (e.g., healthy lungs; lungs afflicted with benign tumors, nodules, lesions, cysts, or scars; lungs afflicted with malignant tumors, nodules, lesions, cysts, or scars; lungs obscured by imaging artifacts, such as glares, shadows, or optical distortions; lungs into which surgical hardware, such as tubing or stitches, has been inserted). In other words, the MRI images on which the deep learning neural network is trained should representatively span whatever lung features or lung qualities to which the deep learning neural network is desired to become agnostic (e.g., it can be desired that the deep learning neural network reliably or confidently enhance the resolution of any MRI image of a lung, regardless of the particular health status or other idiosyncrasies of that lung). Unfortunately, training images depicting such wide variety of lungs can be unavailable. After all, most available MRI images can depict healthy lungs rather than unhealthy lungs (e.g., different types of lung pathologies can be rare or otherwise have low occurrence rates, meaning that such different types of lung pathologies can be imaged significantly less frequently than healthy lungs). Accordingly, the deep learning neural network can fail to learn how to adequately enhance the resolution of MRI images that depict unhealthy or otherwise aberrant lungs.

Various existing techniques attempt to address this dearth of pathological, unhealthy, or otherwise aberrant medical images via image synthesis. In particular, existing techniques involve creating fake medical images (e.g., medical images that are not captured from actual or real-world medical patients) by pasting pathologies into otherwise healthy medical images. Unfortunately, however, such existing techniques often synthesize images that are biologically implausible or otherwise not realistic. Indeed, the training medical images synthesized by existing techniques often appear to be conspicuously fake (e.g., often have highly noticeable pasting artifacts), such that they do not resemble real-world medical images. Such conspicuously-fake synthesized images can be considered as unhelpful in training the deep learning neural network to reliably or confidently perform the inferencing task.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate aberrant image synthesis via truncated reverse-diffusion. In other words, the inventors of various embodiments described herein devised various techniques for synthesizing medical images that depict pathological, unhealthy, or otherwise aberrant anatomical structures, by leveraging truncated operation of diffusion models. A diffusion model can be an artificial neural network that is trained to undo an iterative forward-diffusion process in which noise is incrementally injected into training images. Accordingly, after being trained, iterative execution of the diffusion model can incrementally convert a noisy array into an unnoisy image that resembles whatever images on which the diffusion model was trained. When given any medical image for which a pathological, unhealthy, or aberrant version is desired, various embodiments described herein can involve: pasting a foreign object into the given medical image, thereby yielding a pasted image with apparent or conspicuous pasting artifacts; performing a truncated forward-diffusion process on the pasted image, so as to incrementally inject noise into the pasted image until the apparent or conspicuous pasting artifacts are no longer visibly discernible, but stopping before the pasted image becomes full or complete noise; and reversing that truncated forward-diffusion process by iterative execution of the diffusion model. As described herein, the final reverse-diffused image produced by the diffusion model can visually resemble the pasted image without (or with reduced) pasting artifacts. In other words, the final reverse-diffused image can be considered as a pathological, unhealthy, or aberrant version of the given medical image that is biologically plausible or realistic-looking. Accordingly, that final reverse-diffused image can be considered as a valid pathological, unhealthy, or aberrant medical image that can be used to train any suitable other model to perform any suitable inferencing task as desired.

Various embodiments described herein can be considered as a computerized tool (e.g., any suitable combination of computer-executable hardware or computer-executable software) that can facilitate aberrant image synthesis via truncated reverse-diffusion. In various aspects, such computerized tool can comprise an access component, a model component, an object component, a synthesis component, or an action component.

In various embodiments, there can be a particular medical image. In various aspects, the particular medical image can exhibit any suitable format, size, or dimensionality (e.g., can be a two-dimensional pixel array; can be a three-dimensional voxel array). In various instances, the particular medical image can be captured or otherwise generated by any suitable medical imaging scanner or modality (e.g., by a CT scanner, X-ray scanner, MRI scanner, ultrasound scanner, PET scanner, or NM scanner). In various cases, the particular medical image can depict or otherwise illustrate any suitable anatomical structure (e.g., tissue, organ, body part, or portion thereof) of any suitable medical patient (e.g., human, animal, or otherwise).

In various aspects, it can be desired to synthesize a biologically-plausible version of the particular medical image that depicts the anatomical structure as being afflicted with or otherwise exhibiting a foreign object (e.g., a lesion, a cyst, medical tubing, a catheter). As described herein, the computerized tool can facilitate such synthesis.

In various embodiments, the access component of the computerized tool can electronically access the particular medical image. That is, the access component can receive, retrieve, or obtain the particular medical image from any suitable centralized or decentralized data structures (e.g., graph data structures, relational data structures, hybrid data structures), whether remote from or local to the access component (e.g., can obtain the particular medical image from whatever medical imaging scanner captured or generated it). In any case, the access component can be considered as a conduit through which other components of the computerized tool can electronically interact with (e.g., read, write, edit, copy, manipulate, modify) the particular medical image.

In various embodiments, the model component of the computerized tool can electronically store, maintain, control, or otherwise access a diffusion neural network. In various aspects, the diffusion neural network can exhibit any suitable deep learning internal architecture. For example, the diffusion neural network can include any suitable numbers of any suitable types of layers (e.g., input layer, one or more hidden layers, output layer, any of which can be convolutional layers, dense layers, long short-term memory (LSTM) layers, non-linearity layers, pooling layers, batch normalization layers, or padding layers). As another example, the diffusion neural network can include any suitable numbers of neurons in various layers (e.g., different layers can have the same or different numbers of neurons as each other). As yet another example, the diffusion neural network can include any suitable activation functions (e.g., softmax, sigmoid, hyperbolic tangent, rectified linear unit) in various neurons (e.g., different neurons can have the same or different activation functions as each other). As still another example, the diffusion neural network can include any suitable interneuron connections or interlayer connections (e.g., forward connections, skip connections, recurrent connections).

Regardless of the specific internal architecture of the diffusion neural network, the model component can electronically train the diffusion neural network to incrementally or recursively undo or reverse a forward-diffusion process applied to training medical images.

More specifically, consider any suitable training medical image (e.g., any suitable medical image having the same format, size, or dimensionality as the particular medical image). In various aspects, the model component can perform a forward-diffusion process having any suitable number of time-steps on the training medical image, thereby yielding a sequence of any suitable number of noisy images, each being a progressively-noisier version of the training medical image. In various instances, the model component can, at each time-step, create a respective noisy image by inserting an incremental amount of noise into whichever noisy image was created in the preceding time-step (note that, at the first time-step, noise can be inserted into the training medical image itself). The final noisy image in such sequence can be considered as being full or complete noise (e.g., as having no recognizable visual content of the training medical image).

In various cases, the model component can randomly initialize the trainable internal parameters of the diffusion neural network, and the model component can accordingly commence training the diffusion neural network by reversing or undoing the forward-diffusion process.

In particular, the model component can execute the diffusion neural network on any given noisy image and on a scalar indicating the time-step of that given noisy image, and such execution can cause the diffusion neural network to produce some output. More specifically, the model component can concatenate the given noisy image and the scalar together, the model component can feed that concatenation to the input layer of the diffusion neural network, that concatenation can complete a forward pass through the one or more hidden layers of the diffusion neural network, and the output layer of the diffusion neural network can calculate the output based on activations provided by the one or more hidden layers of the diffusion neural network. In any case, the number or types of parameters in any of the layers of the diffusion neural network can be controlled or otherwise configured such that the output can have the same format, size, or dimensionality as the given noisy image, and thus as the training medical image itself. In various aspects, the output can be considered as an incrementally-denoised version of the given noisy image that is inferred or predicted by the diffusion neural network (e.g., with no or little training, the output can be highly inaccurate). Accordingly, in various instances, the model component can compute an error (e.g., mean absolute error (MAE), mean squared error (MSE), cross-entropy error) between the output and whatever noisy image was produced during a preceding time-step of the forward-diffusion process (e.g., if the current time-step is the first or initial time-step of the forward diffusion process, then the error can be computed between the output and the training medical image itself). In various cases, the model component can then incrementally update the trainable internal parameters of the diffusion neural network via backpropagation (e.g., stochastic gradient descent) driven by that error.

In various aspects, the model component can repeat such forward-diffusion and reverse-diffusion training for any suitable number of training medical images. Such repetition can cause the trainable internal parameters of the diffusion neural network to become iteratively optimized for incrementally denoising of reverse-diffusing inputted medical images.

Now, in various embodiments, the object component of the computerized tool can electronically identify an image (e.g., a pixel array, or a voxel array) of any suitable foreign object. In various aspects, the identified foreign object can be any suitable type of discrete or contiguous object, item, or thing that is not normally, not usually, or otherwise not ideally found in anatomical structures of medical patients. As some non-limiting examples, the identified foreign object can be: a pathological symptom (e.g., a lesion, cyst, or tumor); a piece of surgical hardware (e.g., tubing, an implant); or an imaging artifact (e.g., a shadow, a lens glare, a lens scratch). For case of explanation, the image of the identified foreign object may hereafter be referred to simply as the identified foreign object itself.

In various instances, there can be a foreign object library, and the object component can electronically select the identified foreign object from the foreign object library in any suitable fashion. In some cases, the object component can select the identified foreign object from the foreign object library at random. In other cases, the object component can select the identified foreign object from the foreign object library by leveraging a large language model (LLM). Indeed, each particular foreign object in the foreign object library can have a respective unstructured textual description that states or explains what the particular foreign object is. Moreover, there can be a textual prompt (e.g., typed or provided by a scanner user or scanner technologist associated with the particular medical image) that states or explains an image synthesis goal or objective that is desired to be achieved with respect to the particular medical image (e.g., that states or explains what kind of pathological or aberrant version of the particular medical image is desired to be synthesized), and that requests or commands identification of a foreign object from the foreign object library that would (if it were exhibited by the particular medical image) achieve such image synthesis goal or objective. Accordingly, the object component can execute the LLM (e.g., in retrieval-augmented-generative (RAG) fashion) on the particular medical image, on the textual prompt, and on the textual descriptions of the foreign object library, and such execution can cause the LLM to produce as output synthesized text that semantically answers the textual prompt. That is, the synthesized text can identify which foreign object in the foreign object library would, if it were exhibited by the particular medical image, be considered as achieving the image synthesis goal or objective. Whatever foreign object is indicated in the synthesized text can be considered or otherwise treated as the identified foreign object.

In some aspects, the object component can electronically modify the identified foreign object via any suitable augmentation. As some non-limiting examples, such augmentation can be: any suitable geometric transformation (e.g., rotation, scaling, deformation) that can be applied to the pixels or voxels of the identified foreign object; or any suitable textural transformation (e.g., adjustment of brightness or contrast, insertion of noise) that can be applied to the pixels or voxels of the identified foreign object. In various instances, there can be an augmentation library, and whichever augmentation that the object component applies to the identified foreign object can be selected from the augmentation library in any suitable fashion (e.g., randomly, or via RAG-based execution of the LLM as described above).

Now, in various embodiments, the synthesis component of the computerized tool can electronically generate a synthetic version of the particular medical image, based on the identified foreign object and by applying truncated reverse-diffusion as described herein.

More specifically, the synthesis component can electronically paste the identified foreign object (e.g., after being augmented by the object component) at any suitable location within the particular medical image, thereby yielding a post-paste image. Accordingly, the post-paste image can depict whatever anatomical structure is illustrated by the particular medical image, and at least some of that anatomical structure can now be hidden or obscured behind or underneath the identified foreign object. Note that the post-paste image can have glaring, noticeable, or otherwise conspicuous pasting artifacts (e.g., there can be highly apparent discontinuities that visually separate the identified foreign object from the rest or remainder of the anatomical structure). Accordingly, the post-paste image can be considered as not biologically plausible (e.g., can be considered as unrealistic-looking).

In various aspects, the synthesis component can electronically perform or facilitate a truncated forward-diffusion process on the post-paste image. In various aspects, this can yield a sequence of any suitable number of noisy images, each being a progressively-noisier version of the post-paste image. Indeed, the synthesis component can, at each time-step, create a respective noisy image by inserting an incremental amount of noise into whichever noisy image was created in the preceding time-step (note that, at the first time-step, noise can be inserted into the post-paste image itself). In various instances, the truncated forward-diffusion process can be made up of fewer time-steps than the forward-diffusion process that was used to train the diffusion neural network. Indeed, in various cases, the truncated forward-diffusion process can have a fraction of the total number of time-steps that were used to train the diffusion neural network, such that the final noisy image produced by the truncated forward-diffusion process can be considered as not being full or complete noise (e.g., as still having some recognizable visual content of the post-paste image). In particular, the truncated forward-diffusion process can have whatever number of time-steps causes pasting artifacts to no longer be visually discernible in that final noisy image, but that nevertheless causes the identified foreign object and the unobscured or unhidden portions of the anatomical structure to nevertheless be visually discernible. In some cases, this can be accomplished when the truncated forward-diffusion process has about one-fourth the total number of time-steps as the forward-diffusion process on which the diffusion neural network was trained.

In various aspects, the synthesis component can electronically perform or facilitate, via iterative execution of the diffusion neural network, a truncated reverse-diffusion process, beginning with the final noisy image produced by the truncated forward-diffusion process. That is, the truncated reverse-diffusion process can begin with an intermediate level of noise, rather than with full or complete noise. In various instances, the truncated reverse-diffusion process can yield a sequence of reverse-diffused images, each being a progressively less noisy version of the final noisy image produced during the truncated forward-diffusion process. Indeed, at any given time-step during the truncated reverse-diffusion process, the synthesis component can execute the diffusion neural network on a scalar indicating that given time-step and on whatever reverse-diffused image was produced during the previous time-step of the truncated reverse-diffusion process (e.g., for the first or initial time-step of the truncated reverse-diffusion process, the diffusion neural network can be executed on the final noisy image produced during the truncated forward-diffusion process). Such execution can cause the diffusion neural network to produce or generate a first image that can be considered as an incrementally less noisy version of whatever reverse-diffused image was produced during the previous time-step of the truncated reverse-diffusion process. Now, in some cases, that first image can be fed as input to the diffusion neural network during the next or subsequent time-step of the truncated reverse-diffusion process. Such cases can be referred to as full diffusion. However, in other cases, that first image can be modified by a corresponding noisy image from the truncated forward-diffusion process. In particular, the synthesis component can have, in some aspects, overlaid a mask onto the post-paste image (and thus onto every noisy image produced during the truncated forward-diffusion process and also onto every reverse-diffused image produced during the truncated reverse-diffusion process), such that the mask circumscribes the identified foreign object but does not cover an entirety of the post-paste image. So, the mask can be considered as being overlaid on the first image produced by the diffusion neural network during the given time-step, as well as being overlaid on whatever noisy image was produced at a next or subsequent time-step during the truncated forward-diffusion process. In various aspects, the synthesis component can generate a second image, by replacing: the pixels or voxels of the first image that are outside of the mask; with the pixels or voxels of that noisy image that are outside of the mask. Accordingly, the second image can be fed as input to the diffusion neural network during the next or subsequent time-step of the truncated reverse-diffusion process. Such cases can be referred to as local diffusion (e.g., implementation of the mask can cause only whatever pixels or voxels are inside of (or local to) the mask to be effectively diffused by the diffusion neural network).

In any case, the final reverse-diffused image produced during the truncated reverse-diffusion process can be referred to or otherwise considered as the synthetic version of the particular medical image. Specifically, due to the herein-described pasting and diffusion truncation, the synthetic version of the particular medical image can visually resemble the post-paste image, but without (or otherwise only with suppressed or unnoticeable instantiations of) pasting artifacts. In other words, the herein-described pasting and diffusion truncation can be considered seamlessly blending the identified foreign object into the particular medical image, such that pasting artifacts vanish or are otherwise visually reduced. In still other words, the synthetic version of the particular medical image can be considered as a pathological, unhealthy, or otherwise aberrant version of the particular medical image that is biologically plausible or realistic-looking.

In various embodiments, the action component of the computerized tool can electronically perform any suitable electronic actions, based on the synthetic version of the particular medical image. As a non-limiting example, the action component can leverage or utilize the synthetic version of the particular medical image to train, re-train, or fine-tune any suitable artificial neural network to perform any suitable inferencing task (e.g., image classification, image segmentation, image regression) on inputted medical images.

Various embodiments described herein can be employed to use hardware or software to solve problems that are highly technical in nature (e.g., to facilitate aberrant image synthesis via truncated reverse-diffusion), that are not abstract and that cannot be performed as a set of mental acts by a human. Further, some of the processes performed can be performed by a specialized computer (e.g., diffusion neural network, LLM) for carrying out defined acts related to medical images.

For example, such defined acts can include: accessing, by a device operatively coupled to a processor, a scanned medical image depicting an anatomical structure of a medical patient; and generating, by the device and via a diffusion neural network executed in a truncated reverse-diffusion process beginning at an intermediate level of noise rather than full noise, a synthetic version of the scanned medical image, wherein the synthetic version of the scanned medical image can depict the anatomical structure exhibiting a foreign object.

In some cases, such defined acts can include: pasting, by the device, the foreign object into the scanned medical image, thereby yielding a post-paste image; iteratively inserting, by the device and via a truncated forward-diffusion process, noise into the post-paste image, thereby yielding a sequence of progressively-noisier versions of the post-paste image, wherein a noisiest version of the post-paste image in the sequence of progressively-noisier versions of the post-paste image can be not full noise; and iteratively executing, by the device, the diffusion neural network in the truncated reverse-diffusion process, wherein the truncated reverse-diffusion process can begin with the noisiest version of the post-paste image, and wherein a final time-step output of the truncated reverse-diffusion process can be the synthetic version of the scanned medical image.

In some cases, such defined acts can include: overlaying, by the device, a mask onto the post-paste image, such that the mask circumscribes the foreign object but does not cover an entirety of the post-paste image; and at a current time-step of the truncated reverse-diffusion process: accessing, by the device, a first reverse-diffused image produced during a previous time-step of the truncated reverse-diffusion process; executing, by the device, the diffusion neural network on the first reverse-diffused image, thereby producing a second reverse-diffused image that contains incrementally less noise than the first reverse-diffused image; and replacing, by the device, an unmasked portion of the second reverse-diffused image with an unmasked portion of whichever one of the sequence of progressively-noisier versions of the post-paste image corresponds to a succeeding time-step of the truncated reverse-diffusion process, thereby yielding a third reverse-diffused image that is treated as input for the diffusion neural network during the succeeding time-step Such defined acts are inherently computerized. Indeed, scanned medical images are pixel arrays or voxel arrays that are captured or generated by medical imaging scanners (e.g., CT scanners, MRI scanners, X-ray scanners), which themselves are computerized systems that leverage specific clinical hardware (e.g., X-ray tubes, X-ray detectors, gantries). A medical imaging scanner and the images it captures cannot be implemented in any way whatsoever by the human mind or by humans with mere pen and paper. Moreover, artificial intelligence models (e.g., diffusion neural networks, LLMs) are also inherently computerized constructs comprising specific software-oriented architectures (e.g., input layers, hidden layers, or output layers, any of which can be made up of trainable or non-trainable internal parameters such as convolutional layers or LSTM layers). Artificial intelligence models cannot be trained or executed by the human mind, or by humans with mere pen and paper, in any reasonable or practicable way without computers. Furthermore, electronic image editing operations such as pixel/voxel pasting or pixel/voxel replacement are also inherently computerized or virtual actions that simply cannot be facilitated or executed by the human mind, or by a human with mere pen and paper, in any reasonable or practicable way without computers.

Moreover, various embodiments described herein can integrate into a practical application various teachings relating to aberrant image synthesis via truncated reverse-diffusion. As described above, a deep learning neural network can be trained to perform an inferencing task (e.g., classification, segmentation, regression) on medical images. To help the deep learning neural network become proficient or confident at such inferencing task, the deep learning neural network should be trained not only on medical images that depict healthy anatomical structures, but also on medical images that depict pathological or aberrant anatomical structures. Unfortunately, most available training data shows only healthy or non-aberrant anatomical structures. Some existing techniques attempt to synthesize or fabricate pathological or aberrant medical images by pasting foreign objects into otherwise-healthy medical images. However, such existing techniques often suffer from highly visible pasting artifacts, thereby causing whatever synthetic images that are produced by such existing techniques to be conspicuously or noticeably fake. In other words, existing techniques create synthetic medical images that do not look or appear to be biologically plausible or realistic.

Various embodiments described herein can ameliorate such technical problems, by leveraging truncated diffusion. In particular, for any given medical image for which a pathological or aberrant version is desired, various embodiments described herein can involve: pasting a foreign object into the given medical image; performing a truncated forward-diffusion process on the pasted image, thereby yielding a sequence of progressively-noisier version of the pasted image, the last of which is not full or complete noise; and reversing that truncated forward-diffusion process via iterative execution of a diffusion neural network. In other words, various embodiments described herein can involve a reverse-diffusion process that begins at an intermediate level of noise rather than at full or complete noise, hence the term "truncated". In various aspects, the final image produced during such truncated reverse-diffusion process can substantively or visually resemble the pasted image, but can lack or otherwise exclude any apparent or highly noticeable pasting artifacts of the pasted image. Thus, the final image produced during the truncated reverse-diffusion process can be considered as a synthetic pathological or aberrant version of the given medical image that looks or appears to be realistic. Accordingly, such final image can be used to train any desired deep learning neural network to perform any desired inferencing task on medical images. Therefore, various embodiments described herein can be considered as synthesizing pathological or aberrant medical images that look or appear to be realistic, in contrast to the unrealistic or biologically implausible images synthesized by existing techniques. For at least these reasons, various embodiments described herein certainly constitute a tangible and concrete technical improvement or technical advantage in the field of medical imaging. Accordingly, such embodiments clearly qualify as useful and practical applications of computers.

Furthermore, various embodiments described herein can control real-world tangible devices based on the disclosed teachings. For example, various embodiments described herein can execute or train real-world artificial neural networks, so as to perform inferencing tasks on real-world medical images captured by real-world medical imaging scanners (e.g., X-ray scanners, MRI scanners).

It should be appreciated that the herein figures and description provide non-limiting examples of various embodiments and are not necessarily drawn to scale.

FIG. 1 illustrates a block diagram of an example, non-limiting system 100 that can facilitate aberrant image synthesis via truncated reverse-diffusion in accordance with one or more embodiments described herein. As shown, an aberrant image synthesis system 102 can be electronically integrated, via any suitable wired or wireless electronic connections, with a medical image 104.

In various embodiments, the medical image 104 can be any suitable image exhibiting any suitable format, size, or dimensionality. As a non-limiting example, the medical image 104 can be an x-by-y array of pixels, for any suitable positive integers x and y. As another non-limiting example, the medical image 104 can be an x-by-y-by-z array of voxels, for any suitable positive integers x, y, and z. In various aspects, the medical image 104 can be captured or otherwise generated by any suitable medical imaging scanner, equipment, or modality. As a non-limiting example, the medical image 104 can be captured or generated by an X-ray scanner, in which case the medical image 104 can be a scanned X-ray image. As another non-limiting example, the medical image 104 can be captured or generated by a CT scanner, in which case the medical image 104 can be a scanned CT image. As yet another non-limiting example, the medical image 104 can be captured or generated by an MRI scanner, in which case the medical image 104 can be a scanned MRI image. As even another non-limiting example, the medical image 104 can be captured or generated by an ultrasound scanner, in which case the medical image 104 can be a scanned ultrasound image. As still another non-limiting example, the medical image 104 can be captured or generated by a PET scanner, in which case the medical image 104 can be a scanned PET image. As another non-limiting example, the medical image 104 can be captured or generated by an NM scanner, in which case the medical image 104 can be a scanned NM image.

In any case, the medical image 104 can visually depict or illustrate an anatomical structure 106. In various aspects, the anatomical structure 106 can be any suitable anatomical structure of any suitable medical patient. As some non-limiting examples, the anatomical structure 106 can be any suitable bodily organ of the medical patient, any suitable bodily tissue of the medical patient, any suitable body part of the medical patient, any suitable bodily fluid of the medical patient, any suitable bodily cavity of the medical patient, or any suitable portion thereof.

In various instances, the medical image 104 can have undergone any suitable image reconstruction techniques, such as filtered back projection. In various cases, the medical image 104 can have undergone any other suitable preprocessing or post-processing techniques, such as reorientation, denoising, or resolution enhancement.

In various aspects, the anatomical structure 106 can be healthy, normal, non-pathological, or otherwise non-aberrant. Accordingly, it can be desired to synthesize an image that depicts an unhealthy, unnormal, pathological, or otherwise aberrant version of the anatomical structure 106 that is biologically plausible or realistic-looking. As described herein, the aberrant image synthesis system 102 can facilitate such image synthesis.

In various embodiments, the aberrant image synthesis system 102 can comprise a processor 108 (e.g., computer processing unit, microprocessor) and a non-transitory computer-readable memory 110 that is operably or operatively or communicatively connected or coupled to the processor 108.

The non-transitory computer-readable memory 110 can store computer-executable instructions which, upon execution by the processor 108, can cause the processor 108 or other components of the aberrant image synthesis system 102 (e.g., access component 112, model component 114, object component 116, synthesis component 118, action component 120) to perform one or more acts. In various embodiments, the non-transitory computer-readable memory 110 can store computer-executable components (e.g., access component 112, model component 114, object component 116, synthesis component 118, action component 120), and the processor 108 can execute the computer-executable components.

In various embodiments, the aberrant image synthesis system 102 can comprise an access component 112. In various aspects, the access component 112 can electronically receive, electronically retrieve, or otherwise electronically access the medical image 104 from any suitable electronic source. As a non-limiting example, the access component 112 can electronically obtain the medical image 104 from whatever medical imaging scanner, equipment, or modality captured or generated the medical image 104. In any case, the access component 112 can electronically access the medical image 104, such that the access component 112 can be considered as a proxy or conduit by which other components of the aberrant image synthesis system 102 can electronically interact with the medical image 104.

In various embodiments, the aberrant image synthesis system 102 can comprise a model component 114. In various aspects, the model component 114 can, as described herein, electronically access or train a diffusion neural network.

In various embodiments, the aberrant image synthesis system 102 can comprise an object component 116. In various instances, the object component 116 can, as described herein, electronically identify or select an image of a foreign object.

In various embodiments, the aberrant image synthesis system 102 can comprise a synthesis component 118. In various cases, the synthesis component 118 can, as described herein, electronically generate a synthetic image that realistically depicts the anatomical structure 106 being afflicted by the foreign object, by leveraging the diffusion neural network in a truncated reverse-diffusion process.

In various embodiments, the aberrant image synthesis system 102 can comprise an action component 120. In various aspects, the action component 120 can, as described herein, electronically use the synthetic image as training data, so as to train any other suitable model to perform any suitable inferencing task.

Note that, in various instances, the access component 112, the model component 114, the object component 116, the synthesis component 118, and the action component 120 can collectively be considered as being one or more software components 111 of the aberrant image synthesis system 102. In various aspects, it should be appreciated that the one or more software components 111 are described primarily herein as comprising five components (e.g., the access component 112, the model component 114, the object component 116, the synthesis component 118, and the action component 120) for ease of explanation and illustration. However, the one or more software components 111 are not limited to being implemented as exactly such five components in every embodiment. Indeed, in some embodiments, the functionalities described herein of such five components can be combined in any suitable fashions, so as to be implemented in or by fewer than five components (e.g., in some cases, a single component can perform all of the functionalities that are described herein with respect to the access component 112, the model component 114, the object component 116, the synthesis component 118, and the action component 120). In other embodiments, the functionalities described herein of such five components can instead be distributed, separated, split, or fragmented in any suitable fashions, so as to be implemented in or by more than five components (e.g., two or more components can facilitate the functionalities that are performable by the access component 112; two or more components can facilitate the functionalities that are performable by the model component 114; two or more components can facilitate the functionalities that are performable by the object component 116; two or more components can facilitate the functionalities that are performable by the synthesis component 118; two or more components can facilitate the functionalities that are performable by the action component 120).

Figure 2:
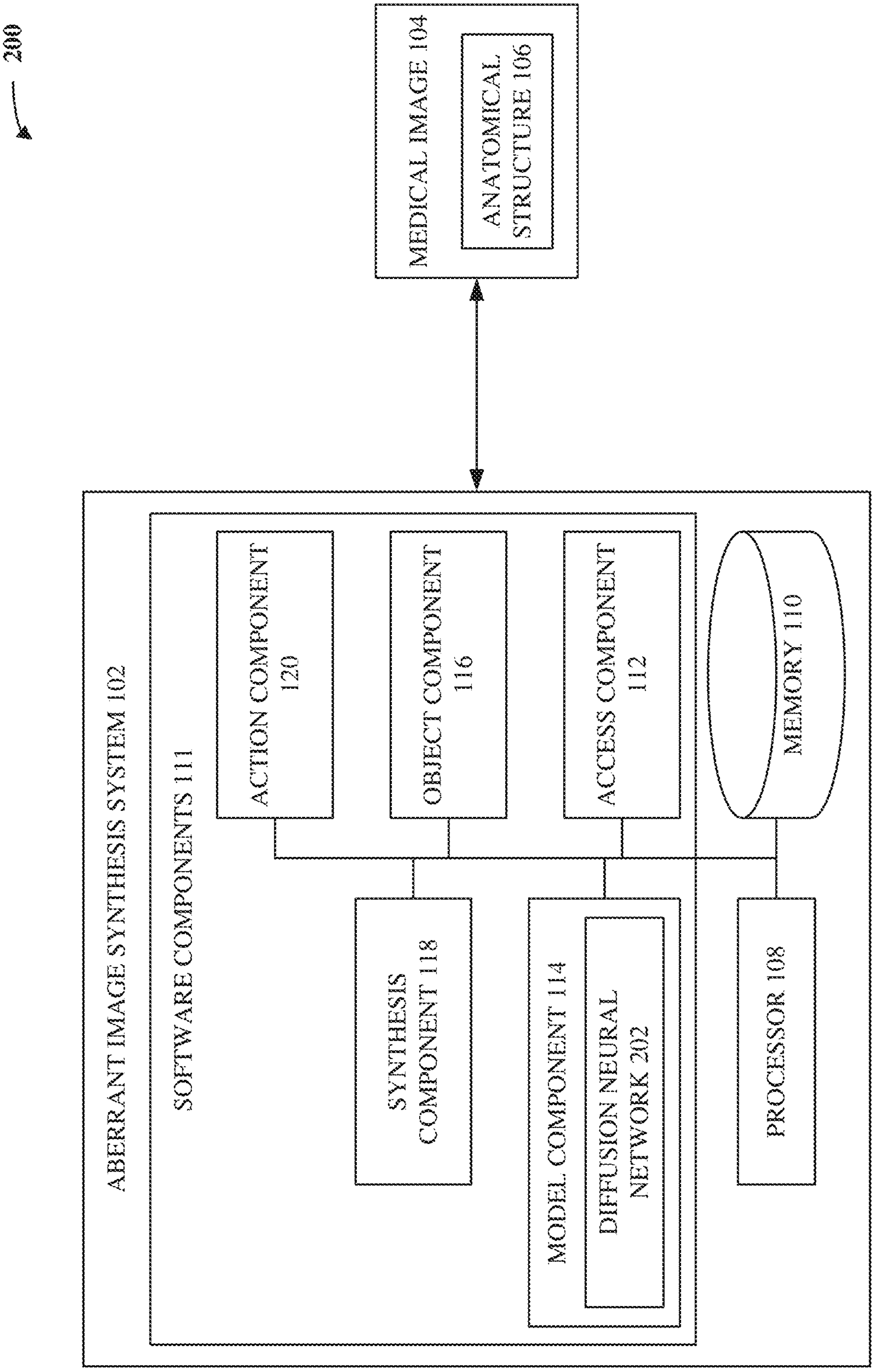
FIG. 2 illustrates a block diagram of an example, non-limiting system including a diffusion neural network that facilitates aberrant image synthesis via truncated reverse-diffusion in accordance with one or more embodiments described herein.

FIG. 2 illustrates a block diagram of an example, non-limiting system 200 including a diffusion neural network that can facilitate aberrant image synthesis via truncated reverse-diffusion in accordance with one or more embodiments described herein. As shown, the system 200 can, in some cases, comprise the same components as the system 100, and can further comprise a diffusion neural network 202.

In various embodiments, the model component 114 can electronically store, electronically maintain, electronically control, or otherwise electronically access the diffusion neural network 202. In various aspects, the diffusion neural network 202 can exhibit any suitable deep learning internal architecture. Indeed, in various cases, the diffusion neural network 202 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. As yet another example, any of such input layer, one or more hidden layers, or output layer can be transformer layers, whose learnable or trainable parameters can be single-head or multi-head attention blocks or other weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of the specific internal architecture (e.g., of the specific numbers, types, or organization of layers) of the diffusion neural network 202, the diffusion neural network 202 can be configured or trained (e.g., by the model component 114) to reverse a forward-diffusion process as applied to medical images. Various non-limiting aspects are described with respect to FIG. 3.

Figure 3:
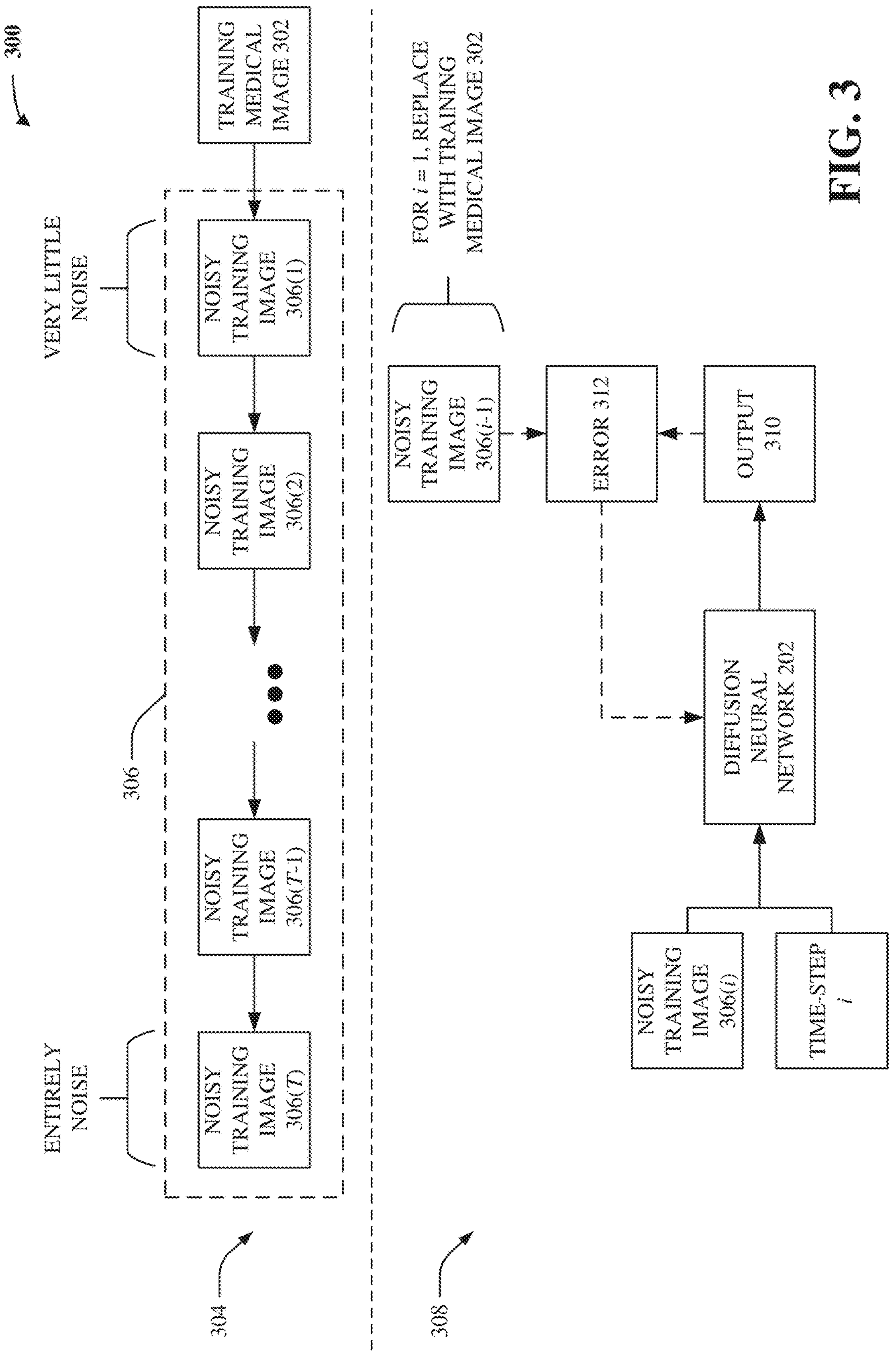
FIG. 3 illustrates an example, non-limiting block diagram showing how a diffusion neural network can be trained in accordance with one or more embodiments described herein.

FIG. 3 illustrates an example, non-limiting block diagram 300 showing how the diffusion neural network 202 can be trained in accordance with one or more embodiments described herein.

In various aspects, prior to beginning training, the trainable internal parameters (e.g., convolutional kernels, weight matrices, bias values) of the diffusion neural network 202 can be initialized (e.g., by the model component 114) in any suitable fashion (e.g., via random initialization).

In various embodiments, there can be a training medical image 302. In various aspects, the training medical image 302 can be any suitable image: having the same format, size, or dimensionality as the medical image 104; depicting an anatomical structure that is of the same type as the anatomical structure 106; or captured or generated by a same type of medical imaging scanner, equipment, or modality as the medical image 104.

In various instances, a forward-diffusion process 304 can be performed (e.g., by the model component 114) on the training medical image 302. In various cases, the forward-diffusion process 304 can involve iteratively or incrementally inserting any suitable type of visual noise (e.g., Gaussian noise, Poisson noise) into the training medical image 302, so as to generate or otherwise yield a sequence of noisy training images 306. In various aspects, the sequence of noisy training images 306 can comprise a total of t images, for any suitable positive integer t: a noisy training image 306(1) to a noisy training image 306(*t*). In various instances, t can be considered as a total number of time-steps in the forward-diffusion process 304. In various cases, each of the sequence of noisy training images 306 can exhibit the same format, size, or dimensionality as the training medical image 302 (e.g., if the training medical image 302 is an x-by-y pixel array, then each of the sequence of noisy training images can likewise be an x-by-y pixel array; if the training medical image 302 is an x-by-y-by-z voxel array, then each of the sequence of noisy training images can likewise be an x-by-y-by-z voxel array). More specifically, each of the sequence of noisy training images 306 can be considered as being a progressively-noisier version of a preceding one of the sequence of noisy training images 306 or of the training medical image 302. As a non-limiting example, the forward-diffusion process 304 can begin by inserting an incremental amount of noise into the training medical image 302, and whatever resultant image is obtained from such noise insertion can be referred to as the noisy training image 306(1). That is, the noisy training image 306(1) can be considered as a slightly noisier version of the training medical image 302. As another non-limiting example, an incremental amount of noise can be inserted into the noisy training image 306(1), and whatever resultant image is obtained from such noise insertion can be referred to as a noisy training image 306(2). So, the noisy training image 306(2) can be considered as a slightly noisier version of the noisy training image 306(1). As yet another non-limiting example, an incremental amount of noise can be inserted into a noisy training image 306(*t*−1), and whatever resultant image is obtained from such noise insertion can be referred to as the noisy training image 306(1). Thus, the noisy training image 306(1) can be considered as a slightly noisier version of the noisy training image 306(*t*−1).

Note that the noisy training image 306(1) can be considered as having very little added noise, since it is formed at the beginning of the forward-diffusion process 304 (e.g., formed during time-step 1 and thus has only one iteration of accumulated noise). In other words, the visual content of the training medical image 302 can be mostly or predominantly visible or discernible in the noisy training image 306(1). In contrast, t can have any suitable value (e.g., in the tens, dozens, or hundreds), such that the noisy training image 306(1) can be considered as being fully, completely, or entirely noise, since it is formed at the end of the forward-diffusion process 304 (e.g., formed in the time-step t and thus has/iterations of accumulated noise). In other words, the visual content of the training medical image 302 can be not visible or discernible in the noisy training image 306(1). In still other words, the noisy training image 306(1) can appear to be a completely random array of pixels or voxels.

Now, in various aspects, the diffusion neural network 202 can be incrementally trained so as to reverse the forward-diffusion process 304. Such reversal can begin at time-step t and can end at time-step 1. In various instances, numeral 308 illustrates how an i-th time-step of such reversal can be performed, for any suitable positive integer 1≤i≤t.

In particular, at the i-th time-step of such reversal, the diffusion neural network 202 can be executed (e.g., by the model component 114) on the time-step i (e.g., a scalar whose value is equal to i) and on a noisy training image 306(*i*) (e.g., whichever of the sequence of noisy training images 306 corresponds to the time-step i). In various cases, such execution can cause the diffusion neural network 202 to produce an output 310. More specifically, the noisy training image 306(*i*) and the time-step i can be concatenated together, that concatenation can be fed or routed to the input layer of the diffusion neural network 202, that concatenation can complete a forward pass through the one or more hidden layers of the diffusion neural network 202, and the output layer of the diffusion neural network 202 can compute the output 310 based on activation maps or feature maps provided by the one or more hidden layers of the diffusion neural network 202.

Note that the format, size, or dimensionality of the output 310 can be dictated by the number, arrangement, sizes, or other characteristics of the neurons, convolutional kernels, LSTM layers, or other internal parameters of the output layer (or of any other layers) of the diffusion neural network 202. Accordingly, the output 310 can be forced to have any desired format, size, or dimensionality, by adding, removing, or otherwise adjusting characteristics of the output layer (or of any other layers) of the diffusion neural network 202. Thus, in various aspects, the output 310 can be forced to have the same format, size, or dimensionality as the noisy training image 306(*i*). In various instances, the output 310 can be considered as being whatever image that the diffusion neural network 202 believes, predicts, or infers is an incrementally-reverse-diffused version of the noisy training image 306(*i*) (e.g., as being whatever image that the diffusion neural network 202 believes has the same underlying visual content as the noisy training image 306(*i*) but with slightly less noise).

In various cases, for i>1, a noisy training image 306(*i*−1) can be considered as a correct, accurate, or ground-truth incrementally-reversed-diffused version of the noisy training image 306(*i*). On the other hand, for i=1, the training medical image 302 can be considered as the correct, accurate, or ground-truth incrementally-reverse-diffused version of the noisy training image 306(*i*). In any case, note that, if the diffusion neural network 202 has so far undergone no or little training, then the output 310 can be highly inaccurate.

That is, the output 310 can be very different from the noisy training image 306($i$−1) (or from the training medical image 302, for i=1).

In various aspects, an error 312 (e.g., MAE, MSE, cross-entropy error) can be computed (e.g., by the model component 114) between the output 310 and the noisy training image 306($i$−1) (or between the output 310 and the training medical image 302, for i=1). In various instances, the trainable internal parameters of the diffusion neural network 202 can be incrementally updated (e.g., by the model component 114) via backpropagation (e.g., stochastic gradient descent) based on the error 312.

In various cases, such execution-and-update procedure can be repeated for any suitable number of training medical images. This can ultimately cause the trainable internal parameters of the diffusion neural network 202 to become iteratively optimized for accurately reverse-diffusing inputted images. In various aspects, any suitable training batch sizes, any suitable error/loss functions, or any suitable training termination criteria can be utilized during such training.

Figure 4:
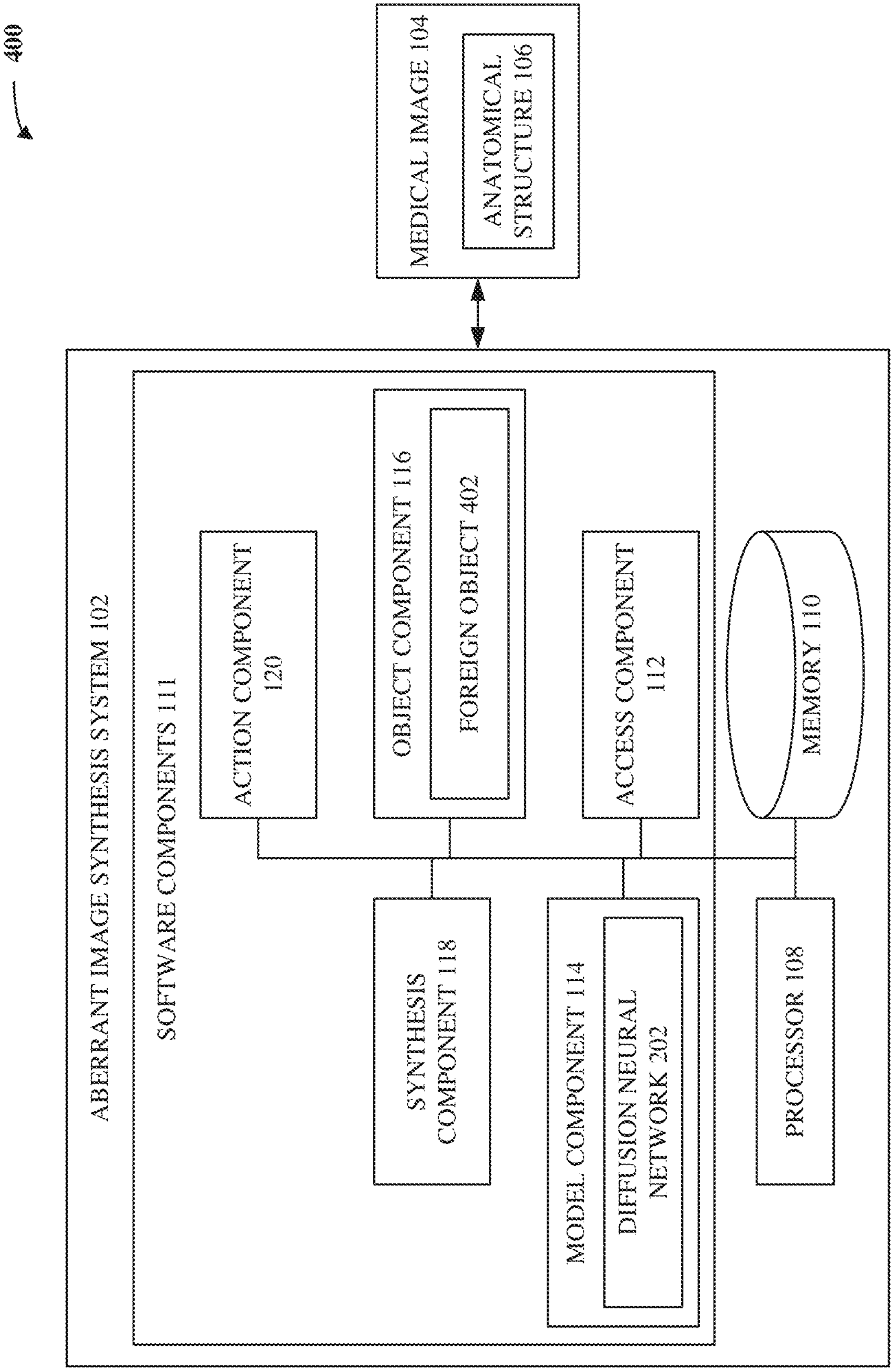
FIG. 4 illustrates a block diagram of an example, non-limiting system including a foreign object that facilitates aberrant image synthesis via truncated reverse-diffusion in accordance with one or more embodiments described herein.

FIG. 4 illustrates a block diagram of an example, non-limiting system 400 including a foreign object that can facilitate aberrant image synthesis via truncated reverse-diffusion in accordance with one or more embodiments described herein. As shown, the system 400 can, in some cases, comprise the same components as the system 200, and can further comprise a foreign object 402.

In various embodiments, the object component 116 can electronically receive, electronically retrieve, electronically obtain, or otherwise electronically access the foreign object 402. In various aspects, the foreign object 402 can be an image that depicts or illustrates any suitable discrete or contiguous object or thing which, if it were exhibited by the anatomical structure 106, would render the anatomical structure 106 unhealthy, pathological, or otherwise clinically or medically aberrant. As a non-limiting example, the foreign object 402 can be or depict any suitable pathology symptom or pathology manifestation, such as a cyst, a lesion, or a tumor. As another non-limiting example, the foreign object 402 can be or depict any suitable surgical hardware, such as medical tubing or medical implants. As even another non-limiting example, the foreign object 402 can be or depict any suitable imaging artifact, such as a lens glare, a lens scratch, or a shadow.

In various instances, the foreign object 402 can be an image that is smaller in size, but nevertheless dimensionally consistent with the medical image 104. As a non-limiting example, suppose that the medical image 104 is an x-by-y pixel array. In such case, the foreign object 402 can be any suitable pixel array whose linear dimensions are less than (e.g., in some cases, many times less than) both x and y, and whose total area is less than (e.g., in some cases, many times less than) xy. As another non-limiting example, suppose that the medical image 104 is an x-by-y-by-z voxel array. In such case, the foreign object 402 can be any suitable voxel array whose linear dimensions are less than (e.g., in some cases, many times less than) x, y, and z, and whose total volume is less than (e.g., in some cases, many times less than) xyz. In other words, the foreign object 402 can be smaller in size than the medical image 104, such that the foreign object 402 can spatially fit within or inside of the medical image 104.

In some cases, the object component 116 can select or identify the foreign object 402 in any suitable fashion. In some instances, the object component 116 can apply any suitable augmentation to the foreign object 402. In some aspects, such selection or augmentation can be facilitated by leveraging a large language model. Non-limiting aspects are described with respect to FIGS. 5-6.

Figure 5:
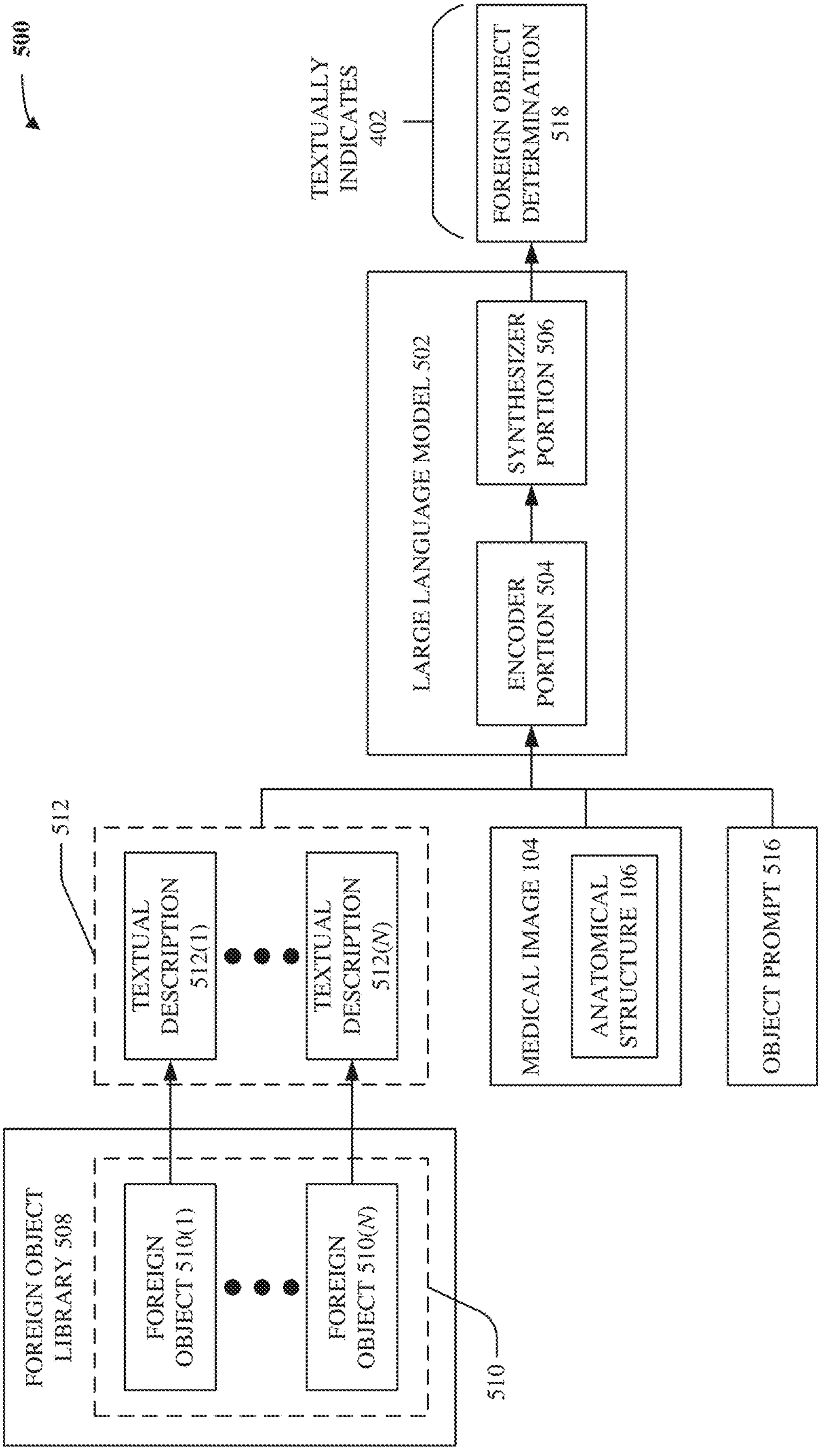
FIGS. 5-6 illustrate example, non-limiting block diagrams showing how a foreign object can be selected or augmented via execution of a large language model in accordance with one or more embodiments described herein.
Figure 6:
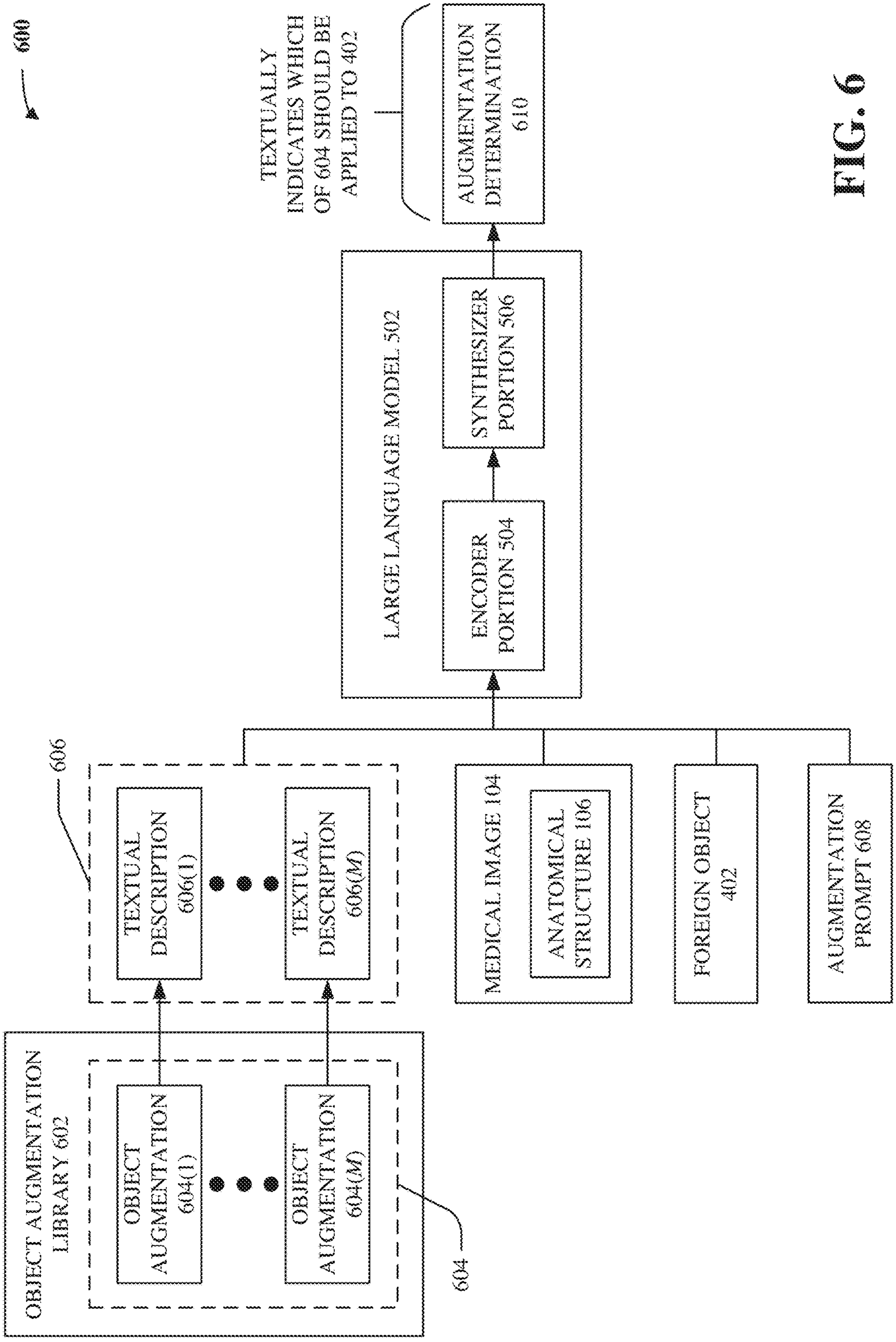

FIGS. 5-6 illustrate example, non-limiting block diagrams 500 and 600 showing how the foreign object 402 can be selected or augmented via execution of a large language model in accordance with one or more embodiments described herein.

First, consider FIG. 5. In various embodiments, there can be a large language model 502 (hereafter "LLM 502"). In various aspects, the LLM 502 can comprise an encoder portion 504 and a synthesizer portion 506. In various cases, the encoder portion 504 can be considered as being upstream from the synthesizer portion 506. Equivalently, the synthesizer portion 506 can be considered as being downstream of the encoder portion 504.

In various aspects, the encoder portion 504 can exhibit any suitable deep learning internal architecture. Indeed, in various cases, the encoder portion 504 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. As even another example, any of such input layer, one or more hidden layers, or output layer can be LSTM layers, whose learnable or trainable parameters can be input-state weight matrices or hidden-state weight matrices. As yet another example, any of such input layer, one or more hidden layers, or output layer can be transformer layers, whose learnable or trainable parameters can be single-head or multi-head attention blocks or other weight matrices. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Likewise, in various instances, the synthesizer portion 506 can exhibit any suitable deep learning internal architecture. Indeed, in various cases, the synthesizer portion 506 can have an input layer, one or more hidden layers, and an output layer. In various instances, any of such layers can be coupled together by any suitable interneuron connections or interlayer connections (e.g., forward connections, skip connections, recurrent connections). Furthermore, in various cases, any of such layers can be any suitable types of neural network layers having any suitable learnable or trainable internal parameters (e.g., any of such input layer, one or more hidden layers, or output layer can be convolutional layers, dense layers, batch normalization layers, LSTM layers, or transformer layers). Further still, in various cases, any of such layers can be any suitable types of neural network layers having any suitable fixed or non-trainable internal parameters (e.g., any of such input layer, one or more hidden layers, or output layer can be non-linearity layers, padding layers, pooling layers, or concatenation layers).

Regardless of the specific internal architecture that is implemented within the encoder portion 504, the encoder portion 504 can be configured to receive textual data (which can be accompanied by any suitable numerical or graphical data) and to produce embeddings (e.g., latent vector representations) based on such inputted textual data. In contrast, regardless of the specific internal architecture that is implemented within the synthesizer portion 506, the synthesizer portion 506 can be configured to receive embeddings produced by the encoder portion 504 and to produce synthesized textual content based on such embeddings. As some non-limiting examples, the LLM 502 can be any of the following: ChatGPT; Gene.AI®; Ollama®; Bard®; Claude®; Scamless®; GitHub CoPilot®; or Amazon CodeWhisperer®.

Now, in various aspects, there can be a foreign object library 508. In various embodiments, as shown, the foreign object library 508 can comprise a plurality of foreign objects 510. In various aspects, the plurality of foreign objects 510 can comprise n objects, for any suitable positive integer n>1: a foreign object 510(1) to a foreign object 510(*n*). In various instances, each of the plurality of foreign objects 510 can be a distinct or unique image depicting a respective foreign object (e.g., a respective cyst, a respective lesion, a respective surgical implant, a respective imaging artifact). So, the foreign object 510(1) can be an image of a first unique foreign object, whereas the foreign object 510(*n*) can be an image of an n-th unique foreign object.

In various aspects, the plurality of foreign objects 510 can respectively correspond to a plurality of textual descriptions 512. Since the plurality of foreign objects 510 can comprise n objects, the plurality of textual descriptions 512 can likewise comprise n descriptions: a textual description 512(1) to a textual description 512(*n*). In various instances, each of the plurality of textual descriptions 512 can be considered as a brief paragraph that is known or deemed to textually explain any suitable clinical or medical details, characteristics, attributes, or properties of a respective one of the plurality of foreign objects 510. As a non-limiting example, the textual description 512(1) can correspond to the foreign object 510(1). Thus, the textual description 512(1) can be one or more first declarative plain text sentences or sentence fragments that collectively explain or elaborate about the foreign object 510(1) (e.g., that summarize what the foreign object 510(1) is; that describe medical or clinical significance or purposes of the foreign object 510(1)). As another non-limiting example, the textual description 512(*n*) can correspond to the foreign object 510(*n*). So, the textual description 512(*n*) can be one or more n-th declarative plain text sentences or sentence fragments that collectively explain or elaborate about the foreign object 510(*n*).

In various aspects, the object component 116 can electronically leverage the LLM 502, so as to select the foreign object 402 from the foreign object library 508.

More specifically, there can be an object prompt 516. In various aspects, the object prompt 516 can be one or more unstructured or plain text sentences or sentence fragments that: describe or explain an aberration objective that is desired to be achieved for the medical image 104 (e.g., that describe or explain a particular illness with which the anatomical structure 106 is desired to be afflicted; that describe or explain a particular treatment or surgical operation to which the anatomical structure 106 is desired to be subjected); and request or command identification of a foreign object from the foreign object library 508 that would, if exhibited by the anatomical structure 106, satisfy that aberration objective. As a non-limiting example, the object prompt 516 can be the following sentences: "Foreign objects respectively defined by the plurality of textual descriptions 512. Patient anatomy pictured in the medical image 104. Which foreign object would cause the patient anatomy to appear to have pneumonia?". As another non-limiting example, the object prompt 516 can be the following sentences: "Foreign objects respectively defined by the plurality of textual descriptions 512. Patient anatomy pictured in the medical image 104. Identify a foreign object that would make the patient anatomy appear to have undergone heart surgery.". In various cases, the object prompt 516 can be written, typed, or otherwise provided by any suitable technician or medical professional that is associated with the medical image 104 (e.g., by a clinician who operated whatever medical imaging scanner captured the medical image 104).

In various aspects, the object component 116 can electronically execute the LLM 502 on the medical image 104, on the object prompt 516, or on the plurality of textual descriptions 512, and such execution can cause the LLM 502 to produce a foreign object determination 518. More specifically, the object component 116 can concatenate the medical image 104, the object prompt 516, and the plurality of textual descriptions 512 (or any combination thereof) together. In various aspects, the object component 116 can feed or route that concatenation to the input layer of the encoder portion 504, that concatenation can complete a forward pass through the one or more hidden layers of the encoder portion 504, and the output layer of the encoder portion 504 can compute or otherwise calculate one or more embeddings (not shown), based on activation maps or feature maps provided by the one or more hidden layers of the encoder portion 504. In various cases, those one or more embeddings can be routed to the input layer of the synthesizer portion 506, those one or more embeddings can complete a forward pass through the one or more hidden layers of the synthesizer portion 506, and the output layer of the synthesizer portion 506 can compute or otherwise calculate the foreign object determination 518 based on activation maps or feature maps provided by the one or more hidden layers of the synthesizer portion 506. Note that, in some cases, the LLM 502 can receive fewer than all of the plurality of textual descriptions 512 (e.g., embedding similarity searching or other RAG-based techniques can be leveraged, such that the LLM 502 is executed on whichever of the plurality of textual descriptions 512 are most semantically relevant to the object prompt 516). In any case, the foreign object determination 518 can be one or more unstructured or plain text declarative sentences or sentence fragments that semantically answer or respond to the object prompt 516. That is, the object prompt 516 can specify any suitable pathology or other aberration that is desired to be exhibited by the anatomical structure 106, and the foreign object determination 518 can be synthesized text that identifies or otherwise indicates which one of the plurality of foreign objects 510 would (as inferred by the LLM 502 based on the content of the plurality of textual descriptions 512) make the anatomical structure 106 look as if it were afflicted with that pathology or aberration. Whichever one of the plurality of foreign objects 510 that is indicated by the foreign object determination 518 can be considered or treated as the foreign object 402.

In this way, the foreign object 402 can be selected or identified by leveraging the LLM 502. However, this is a mere non-limiting example. In other cases, the object component 116 can select the foreign object 402 from the foreign object library 508 in any other suitable fashion (e.g., via random selection).

Now, consider FIG. 6. In various aspects, there can be an object augmentation library 602. In various instances, as shown, the object augmentation library 602 can comprise a plurality of object augmentations 604. In various aspects, the plurality of object augmentations 604 can comprise m augmentations, for any suitable positive integer m>1: an object augmentation 604(1) to an object augmentation 604(*m*). In various instances, each of the plurality of object augmentations 604 can be a distinct or unique geometric transformation (e.g., rotation, up-scaling, down-scaling, deformation) or intensity-based transformation (e.g., brightness or contrast adjustment; textural or noise adjustment) that can be applied to the pixels or voxels of the foreign object 402. So, the object augmentation 604(1) can be a first unique geometric or intensity-based transformation, whereas the object augmentation 604(*m*) can be an n-th unique geometric or intensity-based transformation.

In various aspects, the plurality of object augmentations 604 can respectively correspond to a plurality of textual descriptions 606. Since the plurality of object augmentations 604 can comprise m augmentations, the plurality of textual descriptions 606 can likewise comprise m descriptions: a textual description 606(1) to a textual description 606(*m*). In various instances, each of the plurality of textual descriptions 606 can be considered as a brief paragraph that is known or deemed to textually explain any suitable details, characteristics, attributes, properties, or purposes of a respective one of the plurality of object augmentations 604. As a non-limiting example, the textual description 606(1) can correspond to the object augmentation 604(1). Thus, the textual description 606(1) can be one or more first declarative plain text sentences or sentence fragments that collectively explain or elaborate about the object augmentation 604(1) (e.g., that summarize how the object augmentation 604(1) would change a foreign object). As another non-limiting example, the textual description 606(*m*) can correspond to the object augmentation 604(*m*). So, the textual description 606(*m*) can be one or more m-th declarative plain text sentences or sentence fragments that collectively explain or elaborate about the object augmentation 604(*m*).

In various aspects, the object component 116 can electronically leverage the LLM 502, so as to select an augmentation from the object augmentation library 602.

More specifically, there can be an augmentation prompt 608. In various aspects, the augmentation prompt 608 can be one or more unstructured or plain text sentences or sentence fragments that: describe or explain any suitable augmentation objective that is desired to be achieved for the foreign object 402 with respect to the medical image 104 (e.g., that describe or explain a pathological or surgical severity that is desired to be exhibited by the anatomical structure 106); and request or command identification of an object augmentation from the object augmentation library 602 that would, if applied to the foreign object 402, satisfy that augmentation objective. As a non-limiting example, the augmentation prompt 608 can be the following sentences: "Augmentations respectively defined by the plurality of textual descriptions 606. Patient anatomy pictured in the medical image 104. Foreign object 402 correlated with pneumonia. If the patient anatomy exhibited the foreign object 402, which augmentation could be applied to the foreign object 402 so as to cause the patient anatomy to appear to have severe pneumonia?". As another non-limiting example, the augmentation prompt 608 can be the following sentences: "Augmentations respectively defined by the plurality of textual descriptions 606. Patient anatomy pictured in the medical image 104. Foreign object 402 correlated with pneumonia. If the patient anatomy exhibited the foreign object 402, which augmentation could be applied to the foreign object 402 so as to cause the patient anatomy to appear to have mild pneumonia?". After all, physical symptoms or manifestations of pneumonia might differ in size, shape, or color based on the severity of the pneumonia. In various cases, the augmentation prompt 608 can be written, typed, or otherwise provided by any suitable technician or medical professional that is associated with the medical image 104 (e.g., by a clinician who operated whatever medical imaging scanner captured the medical image 104).

In various aspects, the object component 116 can electronically execute the LLM 502 on the medical image 104, on the foreign object 402, on the augmentation prompt 608, or on the plurality of textual descriptions 606, and such execution can cause the LLM 502 to produce an augmentation determination 610. More specifically, the object component 116 can concatenate the medical image 104, the foreign object 402, the augmentation prompt 608, and the plurality of textual descriptions 606 (or any combination thereof) together. In various aspects, the object component 116 can feed or route that concatenation to the input layer of the encoder portion 504, that concatenation can complete a forward pass through the one or more hidden layers of the encoder portion 504, and the output layer of the encoder portion 504 can compute or otherwise calculate one or more embeddings (not shown), based on activation maps or feature maps provided by the one or more hidden layers of the encoder portion 504. In various cases, those one or more embeddings can be routed to the input layer of the synthesizer portion 506, those one or more embeddings can complete a forward pass through the one or more hidden layers of the synthesizer portion 506, and the output layer of the synthesizer portion 506 can compute or otherwise calculate the augmentation determination 610 based on activation maps or feature maps provided by the one or more hidden layers of the synthesizer portion 506. Note that, in some cases, the LLM 502 can receive fewer than all of the plurality of textual descriptions 606 (e.g., embedding similarity searching or other RAG-based techniques can be leveraged, such that the LLM 502 is executed on whichever of the plurality of textual descriptions 606 are most semantically relevant to the augmentation prompt 608). In any case, the augmentation determination 610 can be one or more unstructured or plain text declarative sentences or sentence fragments that semantically answer or respond to the augmentation prompt 608. That is, the augmentation prompt 608 can specify any suitable augmentation objective to be satisfied by the foreign object 402 (e.g., can specify a desired severity or a desired case of detectability of a pathology corresponding to the foreign object 402), and the augmentation determination 610 can be synthesized text that identifies or otherwise indicates which one of the plurality of object augmentations 604 would (as inferred by the LLM 502 based on the content of the plurality of textual descriptions 606) make the foreign object 402 satisfy that augmentation objective. In various aspects, the object component 116 can electronically apply to the foreign object 402 whichever augmentation is indicated by the augmentation determination 610.

In this way, the foreign object 402 can be augmented (e.g., rotated, resized, distorted, deformed) by leveraging the LLM 502. However, this is a mere non-limiting example. In other cases, the object component 116 can select an augmentation for the foreign object 402 from the object augmentation library 602 in any other suitable fashion (e.g., via random selection).

In any case, the object component 116 can obtain or access the foreign object 402.

Figure 7:
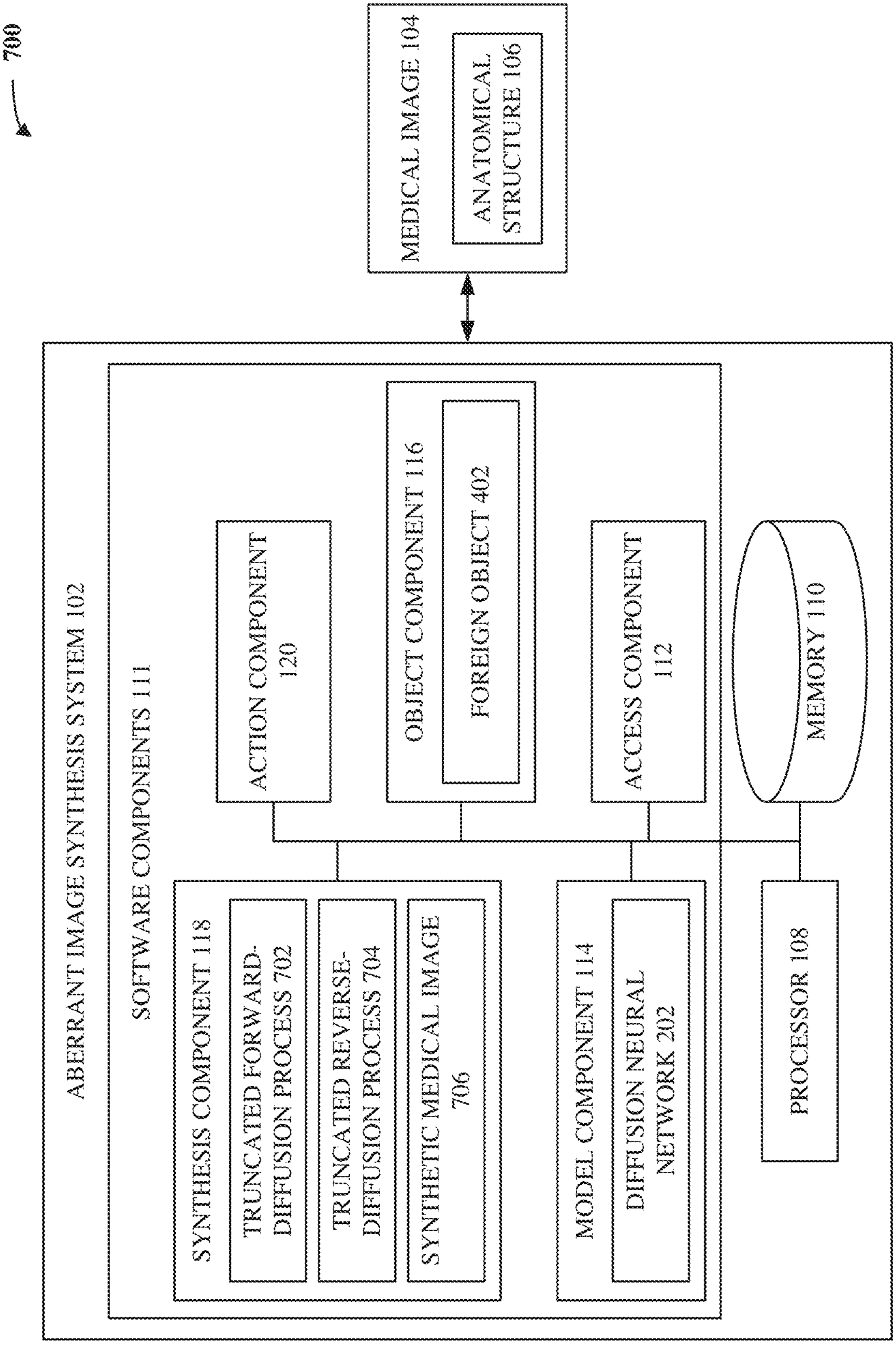
FIG. 7 illustrates a block diagram of an example, non-limiting system including a truncated forward-diffusion process, a truncated reverse-diffusion process, and a synthetic medical image that facilitates aberrant image synthesis via truncated reverse-diffusion in accordance with one or more embodiments described herein.

FIG. 7 illustrates a block diagram of an example, non-limiting system 700 including a truncated forward-diffusion process, a truncated reverse-diffusion process, and a synthetic medical image that can facilitate aberrant image synthesis via truncated reverse-diffusion in accordance with one or more embodiments described herein. As shown, the system 700 can, in some cases, comprise the same components as the system 400, and can further comprise a truncated forward-diffusion process 702, a truncated reverse-diffusion process 704, and a synthetic medical image 706.

In various embodiments, the synthesis component 118 can electronically leverage the diffusion neural network 202 so as to perform the truncated forward-diffusion process 702 and the truncated reverse-diffusion process 704. In various aspects, such performance can yield the synthetic medical image 706. In various instances, the synthetic medical image 706 can have the same format, size, or dimensionality as the medical image 104. More specifically, the synthetic medical image 706 can depict the anatomical structure 106 as being afflicted by, or as otherwise exhibiting, the foreign object 402. Accordingly, the synthetic medical image 706 can be considered as a pathological, unhealthy, or otherwise aberrant version of the medical image 104. Various non-limiting aspects are described with respect to FIGS. 8-13.

FIGS. 8-13 illustrate example, non-limiting block diagrams 800, 900, 1000, 1100, 1200, and 1300 showing how the synthetic medical image 706 can be generated via the truncated forward-diffusion process 702 and the truncated reverse-diffusion process 704 in accordance with one or more embodiments described herein.

Figure 8:
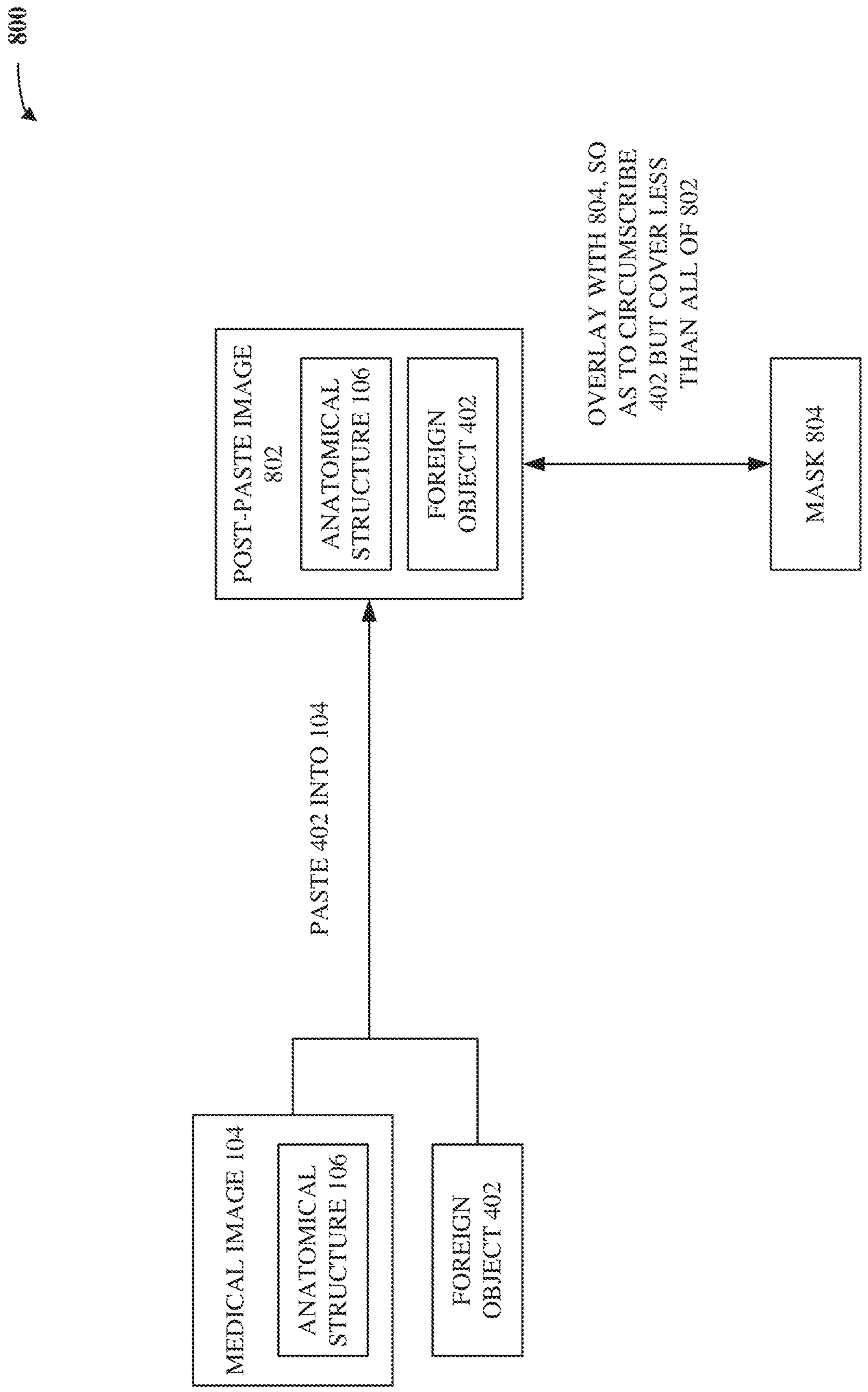
FIGS. 8-13 illustrate example, non-limiting block diagrams showing how a synthetic medical image can be generated via a truncated forward-diffusion process and a truncated reverse-diffusion process in accordance with one or more embodiments described herein.

First, consider FIG. 8. In various embodiments, the synthesis component 118 can electronically paste the foreign object 402 into the medical image 104. The result of such pasting can be referred to as a post-paste image 802. In various aspects, the post-paste image 802 can have the same format, size, or dimensionality as the medical image 104, and can visually depict both the anatomical structure 106 and the foreign object 402. In various instances, at least some of the anatomical structure 106 can thus be obscured or hidden in the post-paste image 802 (e.g., can be obscured or hidden behind the foreign object 402). In various cases, the foreign object 402 can be pasted at any suitable intra-image location within the medical image 104. In some aspects, such intra-image location can be chosen randomly. In other cases, such intra-image location can be chosen manually (e.g., by a user or technician associated with whatever medical imaging scanner captured the medical image 104). In yet other cases, such intra-image location can be determined by the LLM 502 (e.g., by executing the LLM 502 on an appropriate pasting-location-determination prompt).

In any case, the post-paste image 802 can contain conspicuous or noticeable pasting artifacts (e.g., jarring or sudden intensity discontinuities between the foreign object 402 and the surrounding portions of the anatomical structure 106). Thus, the post-paste image 802 can be considered as biologically implausible or otherwise unrealistic-looking.

In some aspects, the synthesis component 118 can electronically overlay a mask 804 onto the post-paste image 802. In various instances, the mask 804 can be any suitable shape (e.g., rectilinear) and can be positioned within the post-paste image 802 such that the mask 804: circumscribes, covers, or encompasses the foreign object 402; but does not circumscribe, cover, or encompass the entirety of the post-paste image 802. Note that the mask 804 can be considered as not being part of the post-paste image 802. Instead, the mask 804 can be considered as segmenting the pixels or voxels of the post-paste image 802 into two sections or portions: a masked section or portion, which includes whichever pixels or voxels of the post-paste image 802 that make up the foreign object 402; and an unmasked section or portion, which includes the remaining pixels or voxels of the post-paste image 802.

Figure 9:
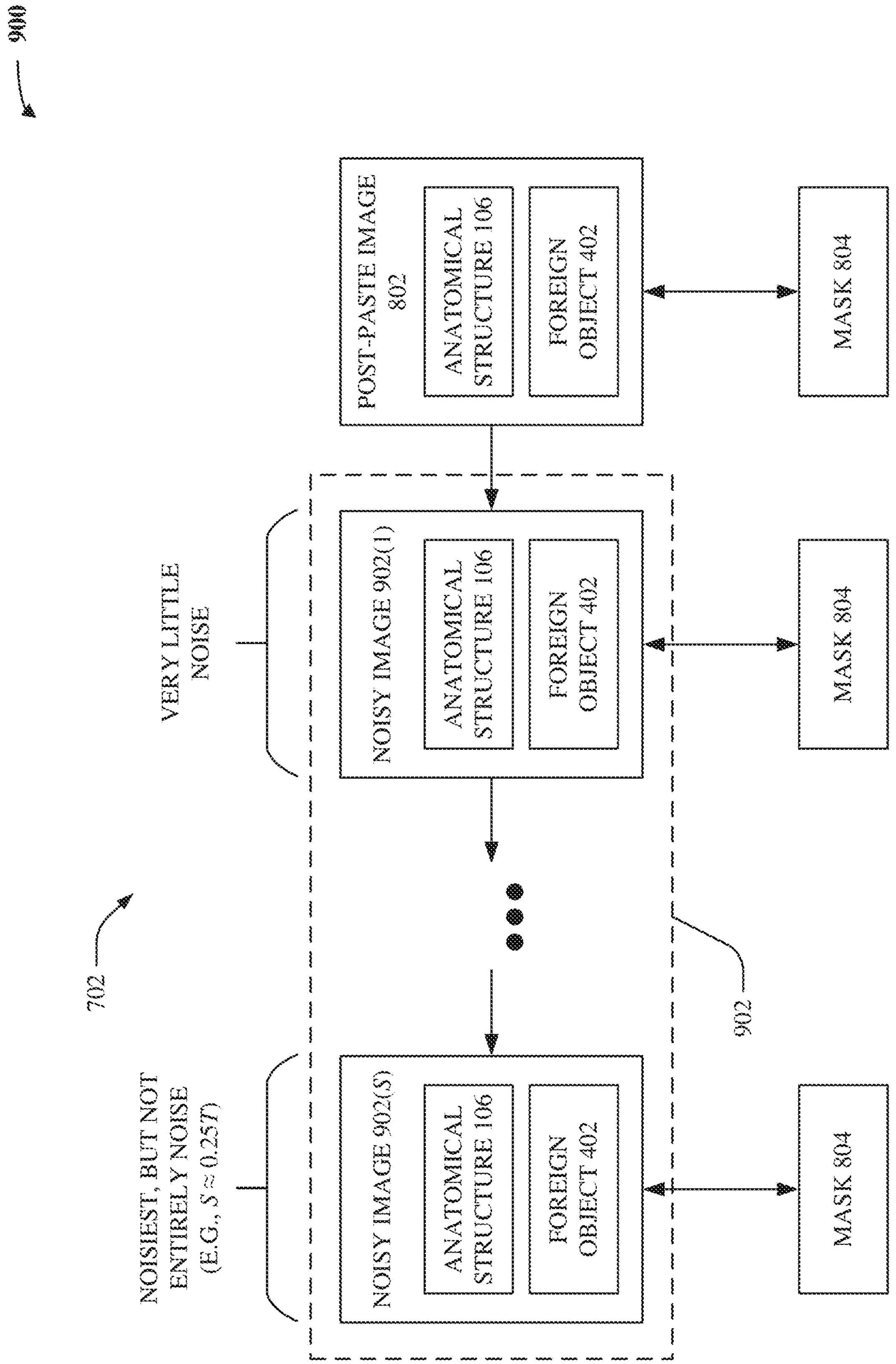

Now, consider FIG. 9. In various embodiments, the synthesis component 118 can electronically perform the truncated forward-diffusion process 702 on the post-paste image 802. In various aspects, the truncated forward-diffusion process 702 can yield a sequence of noisy images 902, each being a progressively-noisier version of the post-paste image 802. In various instances, each time-step of the truncated forward-diffusion process 702 can involve insertion of the same type or amount of incremental noise (e.g., Gaussian noise, Poisson noise) that was used during each time-step of the forward-diffusion process 304. However, the truncated forward-diffusion process 702 can comprise fewer time-steps than the forward-diffusion process 304, hence the term "truncated". In particular, the truncated forward-diffusion process 702 can comprise a total of s time-steps, for any suitable positive integer $1<s<t$. Accordingly, the sequence of noisy images 902 can comprise s images: a noisy image 902(1) to a noisy image 902($s$). In various instances, each of the sequence of noisy images 902 can exhibit the same format, size, or dimensionality as the post-paste image 802. More specifically, each of the sequence of noisy images 902 can be considered as being a progressively-noisier version of a preceding one of the sequence of noisy images 902 or of the post-paste image 802. As a non-limiting example, the truncated forward-diffusion process 702 can begin, at time-step 1, by inserting an incremental amount of noise into the post-paste image 802, and whatever resultant image is obtained from such noise insertion can be referred to as the noisy image 902(1). That is, the noisy image 902(1) can be considered as a slightly noisier version of the post-paste image 802. As another non-limiting example, an incremental amount of noise can, at time-step 2, be inserted into the noisy image 902(1), and whatever resultant image is obtained from such noise insertion can be referred to as a noisy image 902(2) (not shown). So, the noisy image 902(2) can be considered as a slightly noisier version of the noisy image 902(1). As yet another non-limiting example, an incremental amount of noise can, at time-step s, be inserted into a noisy image 902($s-1$) (not shown), and whatever resultant image is obtained from such noise insertion can be referred to as the noisy image 902($s$). Thus, the noisy image 902($s$) can be considered as a slightly noisier version of the noisy image 902($s-1$).

Note that the noisy image 902(1) can be considered as having very little added noise, since it is formed at the beginning of the truncated forward-diffusion process 702 (e.g., form in time-step 1 and thus has only one iteration of accumulated noise). In other words, the visual content of the post-paste image 802 (e.g., the foreign object 402 and the anatomical structure 106) can be mostly or predominantly visible or discernible in the noisy image 902(1). In contrast, the noisy image 902($s$) can be considered as the noisiest of the sequence of noisy images 902, since it is formed at the end of the truncated forward-diffusion process 702 (e.g., formed in time-step s and thus has s iterations of accumulated noise). However, because s<t, the noisy image 902(*s*) can be not entirely or completely noise. In other words, the noisy image 902(*s*) does not appear to be a completely or fully random array of pixels or voxels. Instead, at least some of the visual content of the post-paste image 802 (e.g., the foreign object 402 and the anatomical structure 106) can be visible or discernible in the noisy image 902(*s*). Indeed, in some aspects, s can have any suitable value, such that the foreign object 402 and the anatomical structure 106 are visibly discernible in the noisy image 902(*s*), but such that any pasting artifacts are not visibly discernible in the noisy image 902(*s*). In some cases, this can be accomplished by setting s to be equal to about 25% (e.g., one-fourth) of t. However, this is a mere non-limiting example. In other embodiments, s can be any other suitable fraction of t.

Note that the mask 804 can be considered as being overlaid onto each of the sequence of noisy images 902. As a non-limiting example, suppose that the mask 804 covers the a-th through b-th rows of pixels and the c-th through d-th columns of pixels of the post-paste image 802. In such case, the mask 804 can be considered as covering the a-th through b-th rows of pixels and the c-th through d-th columns of pixels of the noisy image 902(1). Likewise, the mask 804 can be considered as covering the a-th through b-th rows of pixels and the c-th through d-th columns of pixels of the noisy image 902(*s*).

Figure 10:
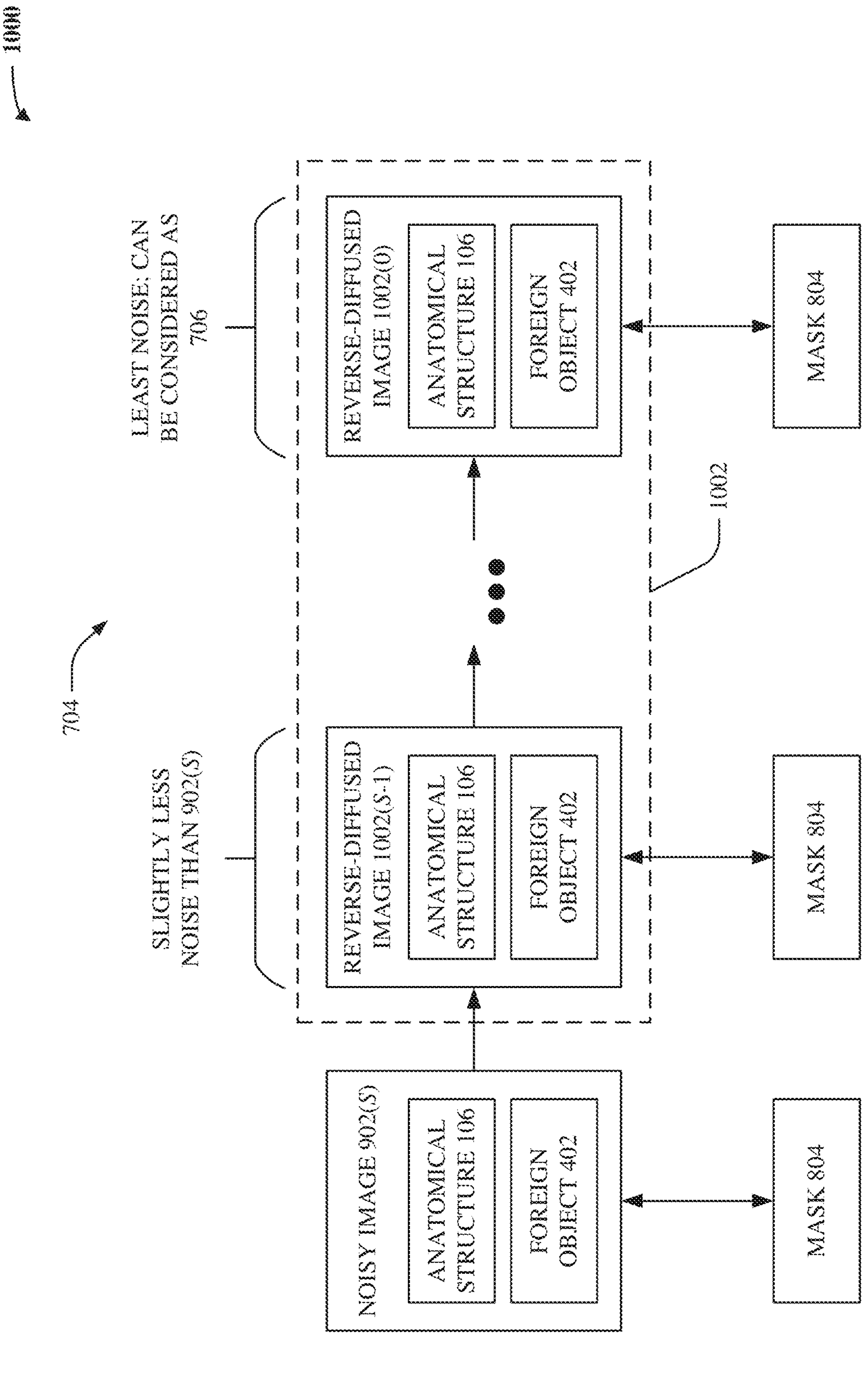

Now, consider FIG. 10. In various aspects, the synthesis component 118 can electronically perform the truncated reverse-diffusion process 704 on the noisy image 902(*s*). In various aspects, the truncated reverse-diffusion process 704 can yield a sequence of reverse-diffused images 1002. In various instances, the truncated reverse-diffusion process 704 can begin at the time-step s and can end at the time-step 1. Accordingly, the sequence of reverse-diffused images 1002 can comprise s images: a reverse-diffused image 1002(*s*−1) to a reverse-diffused image 1002(0). In various instances, each of the sequence of reverse-diffused images 1002 can exhibit the same format, size, or dimensionality as the noisy image 902(*s*). More specifically, each of the sequence of reverse-diffused images 1002 can be considered as being a progressively-less-noisy version of a preceding one of the sequence of reverse-diffused images 1002 or of the noisy image 902(*s*). As a non-limiting example, the truncated reverse-diffusion process 704 can begin, at time-step s, by executing the diffusion neural network 202 on the noisy image 902(*s*), and such execution can directly or indirectly yield the reverse-diffused image 1002(*s*−1). That is, the reverse-diffused image 1002(*s*−1) can be considered as a slightly less noisy version of the noisy image 902(*s*). As another non-limiting example, the diffusion neural network 202 can, at time-step s−1, be executed on the reverse-diffused image 1002(*s*−1), and such execution can directly or indirectly yield a reverse-diffused image 1002(*s*−2) (not shown). So, the reverse-diffused image 1002(*s*−2) can be considered as a slightly less noisy version of the reverse-diffused image 1002(*s*−1). As yet another non-limiting example, the diffusion neural network 202 can, at time-step 1, be executed on a reverse-diffused image 1002(1) (not shown), and such execution can directly or indirectly yield the reverse-diffused image 1002(0). So, the reverse-diffused image 1002(0) can be considered as a slightly less noisy version of the reverse-diffused image 1002(1).

Note that, for the truncated reverse-diffusion process 704, time-step can refer to the index of whichever image is being fed as input to the diffusion neural network 202, rather than to the index of whichever image is directly or indirectly created by the diffusion neural network 202 (contrast this with the truncated forward-diffusion process 702, where time-step can refer to the index of the noisy image that is produced rather than the index of the image into which noise is inserted). For instance, the reverse-diffused image 1002(*s*−1) can be considered as being created or formed during the time-step s of the truncated reverse-diffusion process 704, since the reverse-diffused image 1002(*s*−1) is created from the noisy image 902(*s*). Similarly, note that the reverse-diffused image 1002(0) can be considered as being created or formed during the time-step 1 of the truncated reverse-diffusion process 704, since the reverse-diffused image 1002(0) is created from the reverse-diffused image 1002(1).

Furthermore, note that the reverse-diffused image 1002(*s*−1) can be considered as having the most amount of noise out of the sequence of reverse-diffused images 1002, since it is formed at the beginning of the truncated reverse-diffusion process 704 (e.g., formed in time-step s and thus has accumulated only one iteration of reverse-diffusion). In contrast, the reverse-diffused image 1002(0) can be considered as having the least amount of noise out of the sequence of reverse-diffused images 1002, since it is formed at the end of the truncated reverse-diffusion process 704 (e.g., formed in time-step 1 and thus has accumulated s iterations of reverse-diffusion).

As above, note that the mask 804 can be considered as being overlaid onto each of the sequence of reverse-diffused images 1002. Consider again the above example where the mask 804 covers the a-th through b-th rows of pixels and the c-th through d-th columns of pixels of the post-paste image 802. In such case, the mask 804 can be considered as covering the a-th through b-th rows of pixels and the c-th through d-th columns of pixels of the reverse-diffused image 1002(*s*−1). Likewise, the mask 804 can be considered as covering the a-th through b-th rows of pixels and the c-th through d-th columns of pixels of the reverse-diffused image 1002(0).

Figure 11:
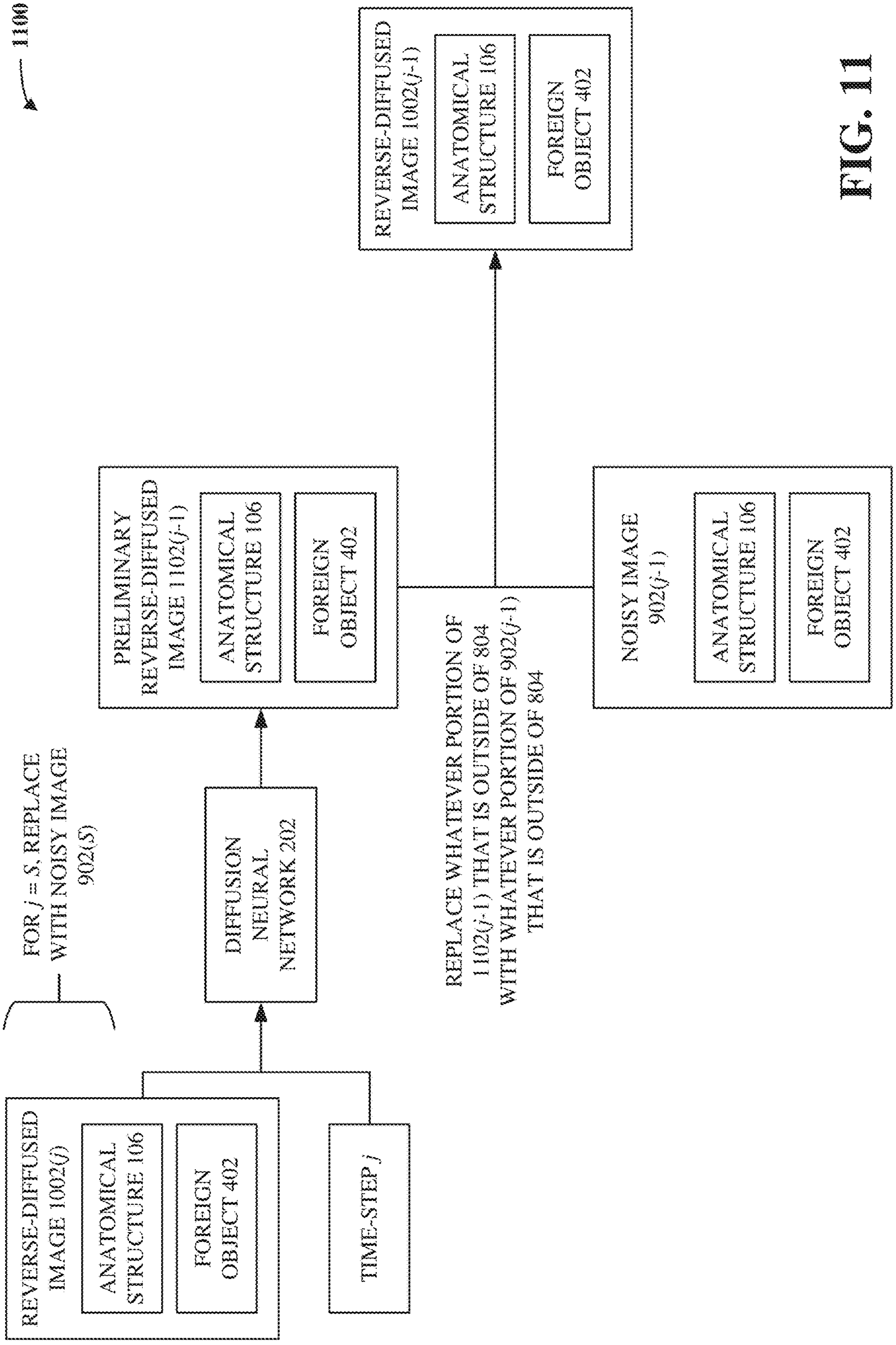
Figure 12:
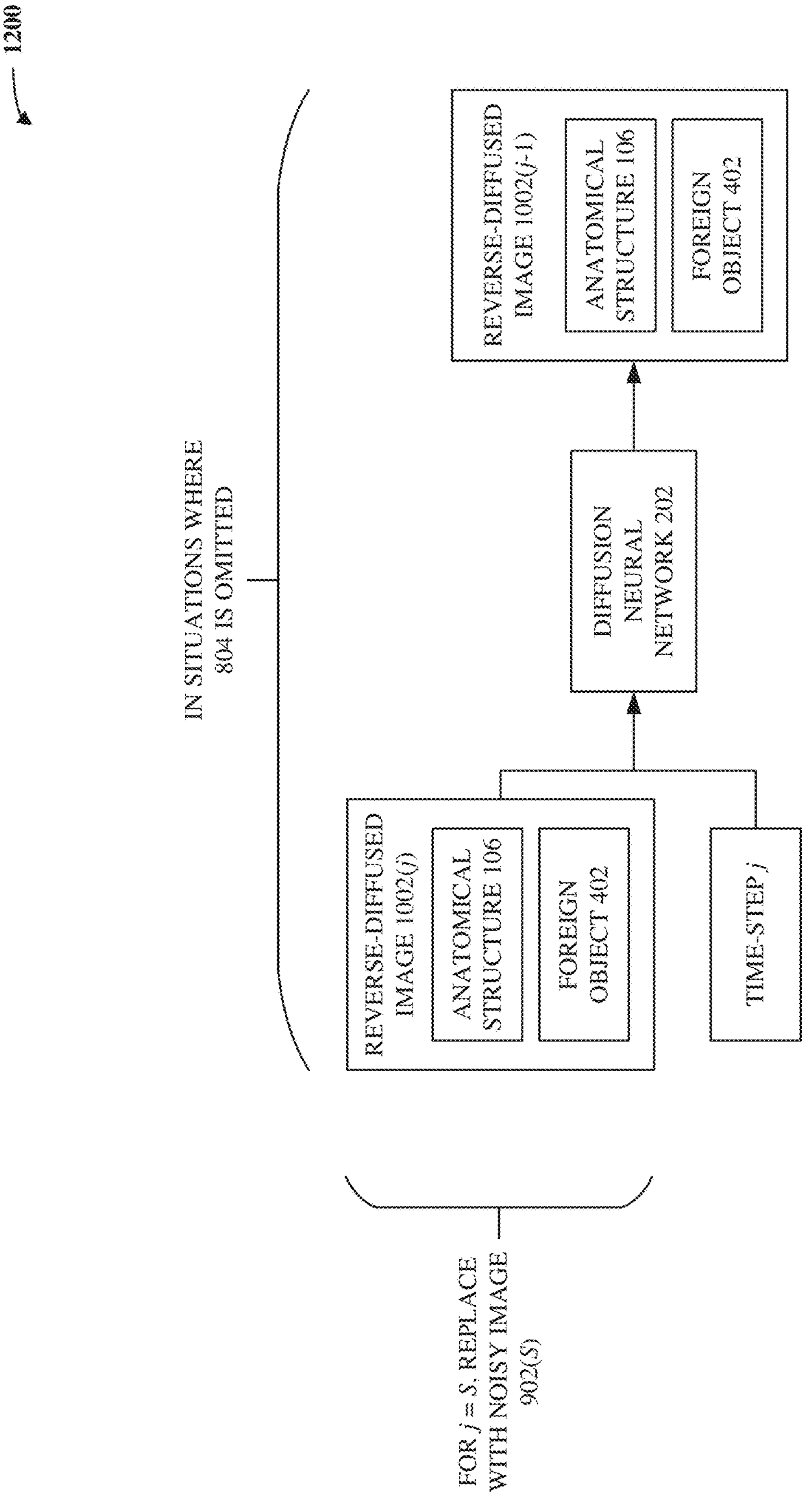

Now, consider FIG. 11. FIG. 11 illustrates in non-limiting fashion how the synthesis component 118 can perform a time-step j of the truncated reverse-diffusion process 704, for any suitable positive integer 1≤j≤s.

In particular, at the time-step j of the truncated reverse-diffusion process 704 for j<s, the synthesis component 118 can execute the diffusion neural network 202 on the time-step j (e.g., a scalar whose value is equal to j) and on a reverse-diffused image 1002(*j*) (e.g., on whichever of the sequence of reverse-diffused images 1002 was created during the time-step (j+1) of the truncated reverse-diffusion process 704). However, for j=s, the synthesis component 118 can execute the diffusion neural network 202 on the time-step j and on the noisy image 902(*s*). In any case, execution of the diffusion neural network 202 during the time-step j can cause the diffusion neural network 202 to produce a preliminary reverse-diffused image 1102(*j*−1). More specifically, the time-step j and the reverse-diffused image 1002(*j*) (or the noisy image 902(*s*), for j=s) can be concatenated together, that concatenation can be fed or routed to the input layer of the diffusion neural network 202, that concatenation can complete a forward pass through the one or more hidden layers of the diffusion neural network 202, and the output layer of the diffusion neural network 202 can compute the preliminary reverse-diffused image 1102(*j*−1) based on activation maps or feature maps provided by the one or more hidden layers of the diffusion neural network 202.

Note that, due to how the diffusion neural network 202 was trained (as described with respect to FIG. 4), the preliminary reverse-diffused image 1102(*j*−1) can be an image having the same visual content as the reverse-diffused image 1002(*j*) (or as the noisy image 902(*s*), for j=1), but containing slightly less noise than the reverse-diffused image 1002(*j*) (or than the noisy image 902(*s*), for j=1). Thus, the preliminary reverse-diffused image 1102(*j*−1) can depict the anatomical structure 106 and the foreign object 402, slightly more clearly than the reverse-diffused image 1002(*j*) (or than the noisy image 902(*s*), for j=1).

In some situations, the synthesis component 118 can electronically generate a reverse-diffused image 1002(*j*−1) (e.g., a respective one of the sequence of reverse-diffused images 1002), by manipulating the pixels or voxels of the preliminary reverse-diffused image 1102(*j*−1) based on the mask 804. In particular, the synthesis component 118 can electronically replace: whatever pixels or voxels of the preliminary reverse-diffused image 1102(*j*−1) that are located outside of (e.g., that are not circumscribed or encompassed by) the mask 804; with whatever pixels or voxels of a noisy image 902(*j*−1) (e.g., whichever one of the sequence of noisy images 902 was produced during the truncated forward-diffusion process 702 at the time-step (j−1)) that are located outside of the mask 804. The resultant image obtained by such pixel or voxel replacement can be considered as the reverse-diffused image 1002(*j*−1).

In some cases, implementing the mask 804 in the truncated reverse-diffusion process 704 can be considered or referred to as local truncated reverse-diffusion. After all, even though the diffusion neural network 202 can be considered as diffusing all pixels or voxels of the reverse-diffused image 1002(*j*) at the time-step j, pixel/voxel replacement based on the mask 804 can be considered as causing whatever diffusing work that the diffusion neural network 202 performs outside of the mask 804 to be discarded. Thus, when the mask 804 is implemented, only diffusion that is inside the mask 804, and thus local to the foreign object 402, can be considered as being tracked.

However, such local truncated reverse-diffusion is a non-limiting example. In other embodiments, the mask 804 can be omitted. In such cases, the preliminary reverse-diffused image 1102(*j*−1) can be considered as being equal to the reverse-diffused image 1002(*j*−1). Such cases can be considered or referred to as full or non-local truncated reverse-diffusion. After all, the diffusion neural network 202 can be considered as diffusing all pixels or voxels of the reverse-diffused image 1002(*j*) at the time-step j, and, since there is no pixel/voxel replacement being performed based on the mask 804, all of the diffusing work that the diffusion neural network 202 performs outside of the mask 804 can be considered as being tracked or not discarded. Performance of the time-step j without the mask 804 is non-limitingly illustrated in FIG. 12.

In any case, the reverse-diffused image 1002(0) (e.g., the last or final one of the sequence of reverse-diffused images 1002) can be considered as having a least amount of noise of the sequence of reverse-diffused images 1002. Moreover, the reverse-diffused image 1002(0) can have the same underlying or substantive visual content as the post-paste image 802 (e.g., can depict both the anatomical structure 106 and the foreign object 402). However, unlike the post-paste image 802, the reverse-diffused image 1002(0) can contain no (or can contain suppressed, reduced, unnoticeable, or inconspicuous) pasting artifacts. Indeed, the diffusion neural network 202 can, during the truncated reverse-diffusion process 704, be considered as incrementally blending the edges or boundaries of the foreign object 402 together into the anatomical structure 106. The final result (e.g., after s total time-steps of accumulated reverse-diffusion) can be that the foreign object 402 appears in the reverse-diffused image 1002(0) to have been naturally or gradually formed or grown within or on the anatomical structure 106, as opposed to having been unnaturally or suddenly pasted into or onto the anatomical structure 106. Accordingly, the reverse-diffused image 1002(0) can be considered as being a biologically plausible or realistic version of the post-paste image 802. In other words, the reverse-diffused image 1002(0) can be considered as being an aberrant or unhealthy version of the medical image 104 that is nevertheless realistic-looking. Therefore, the reverse-diffused image 1002(0) can be considered or referred to as the synthetic medical image 706.

Figure 13:
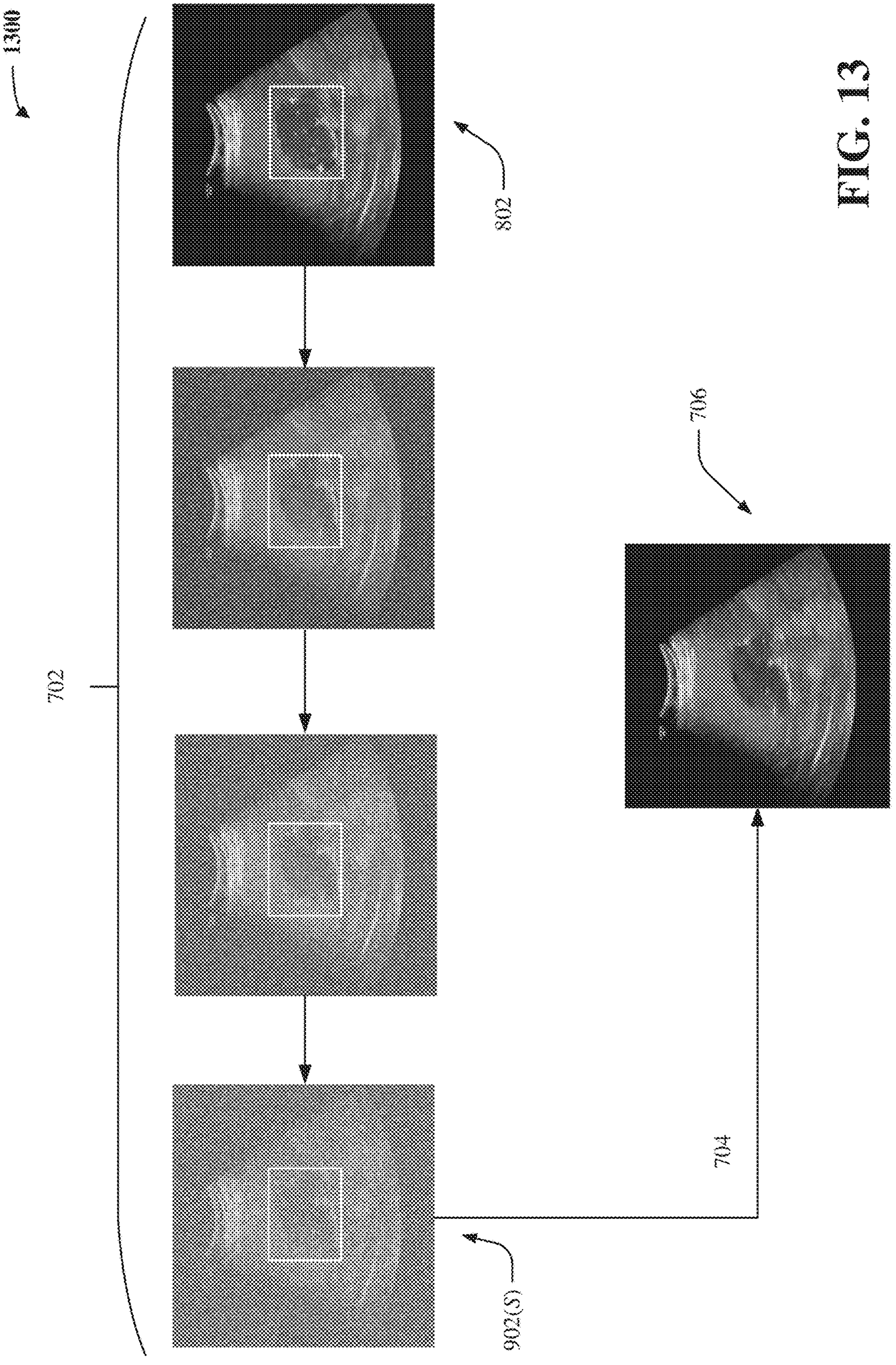

Now, consider FIG. 13. As shown, FIG. 13 depicts a real-world non-limiting example embodiment of the truncated forward-diffusion process 702 and of the truncated reverse-diffusion process 704 as applied to the post-paste image 802. In the non-limiting example of FIG. 13, the post-paste image 802 is an ultrasound image into which a large, oval lesion has been pasted. A white rectangle is overlaid on the post-paste image 802, to represent the mask 804. As can be seen, the post-paste image 802 has conspicuous or noticeable pasting artifacts (e.g., a sharp discontinuity between the lesion and the surrounding anatomy). As shown, the truncated forward-diffusion process 702 can create a sequence of progressively-noisier versions (e.g., 902) of the post-paste image 802, culminating with the noisy image 902(*s*). As can be seen, the noisy image 902(*s*) in this example is not completely, fully, or entirely noise. Indeed, the primary anatomical structures and the lesion of the post-paste image 802 are still visible or discernible in the noisy image 902(*s*). However, note that there are no noticeable, conspicuous, or otherwise discernible pasting artifacts in the noisy image 902(*s*). The truncated reverse-diffusion process 704 can then be performed, beginning with the noisy image 902(*s*), and culminating with the synthetic medical image 706 (e.g., with the reverse-diffused image 1002(0)). As can be seen, the synthetic medical image 706 can have the same underlying visual content of the post-paste image 802, but without (or, at most, with very suppressed or less noticeable) pasting artifacts. In particular, the truncated reverse-diffusion process 704 caused the lesion to become softly or gradually blended into the surrounding anatomy, which makes the lesion visually appear to be biologically plausible or realistic (e.g., as if the lesion had naturally grown in the surrounding anatomy).

In various embodiments, the action component 120 can electronically perform or initiate any suitable electronic actions, based on the synthetic medical image 706. As a non-limiting example, the action component 120 can utilize the synthetic medical image 706 as a training medical image, so as to train (e.g., in supervised, unsupervised, or reinforcement fashion) any other suitable machine learning model to perform any suitable inferencing task (e.g., classification, segmentation, regression) on inputted medical images.

FIGS. 14-20 illustrate example, non-limiting experimental results 1400, 1500, 1600, 1700, 1800, 1900, and 2000 in accordance with one or more embodiments described herein.

Figure 14:
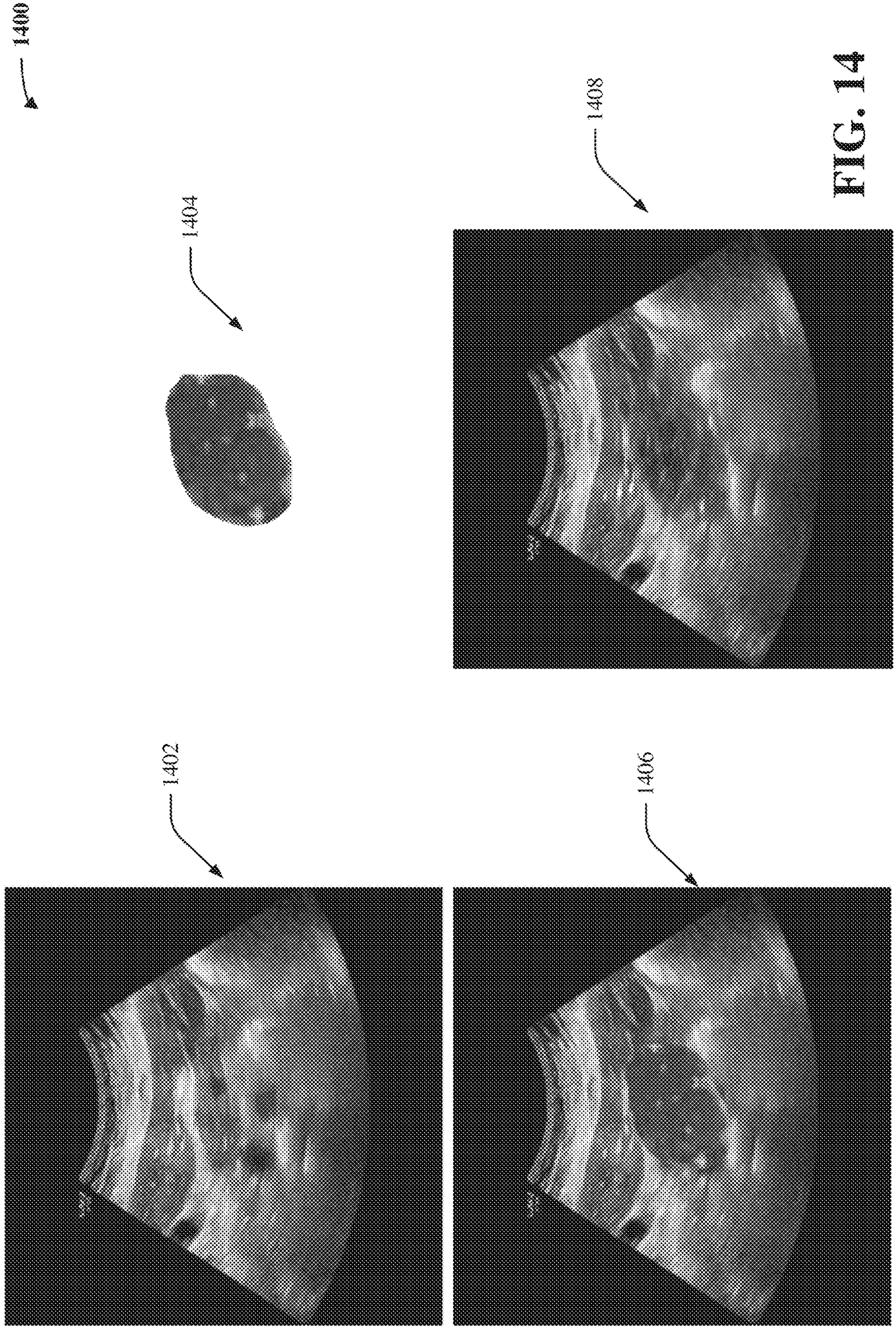
FIGS. 14-20 illustrate example, non-limiting experimental results in accordance with one or more embodiments described herein.

First, consider FIG. 14, which shows an ultrasound image 1402, a lesion 1404, a pasted image 1406, and a locally-diffused image 1408. The pasted image 1406 was obtained by pasting the lesion 1404 into the ultrasound image 1402. The locally-diffused image 1408 was obtained by performing the truncated forward-diffusion process 702 and the truncated reverse-diffusion process 704 on the pasted image 1406, in accordance with FIG. 11. As shown, the locally-diffused image 1408 appears to be much more realistic than the pasted image 1406. Thus, the locally-diffused image 1408 can be considered as a synthetic yet biologically-plausible aberrant version of the ultrasound image 1402.

Figure 15:
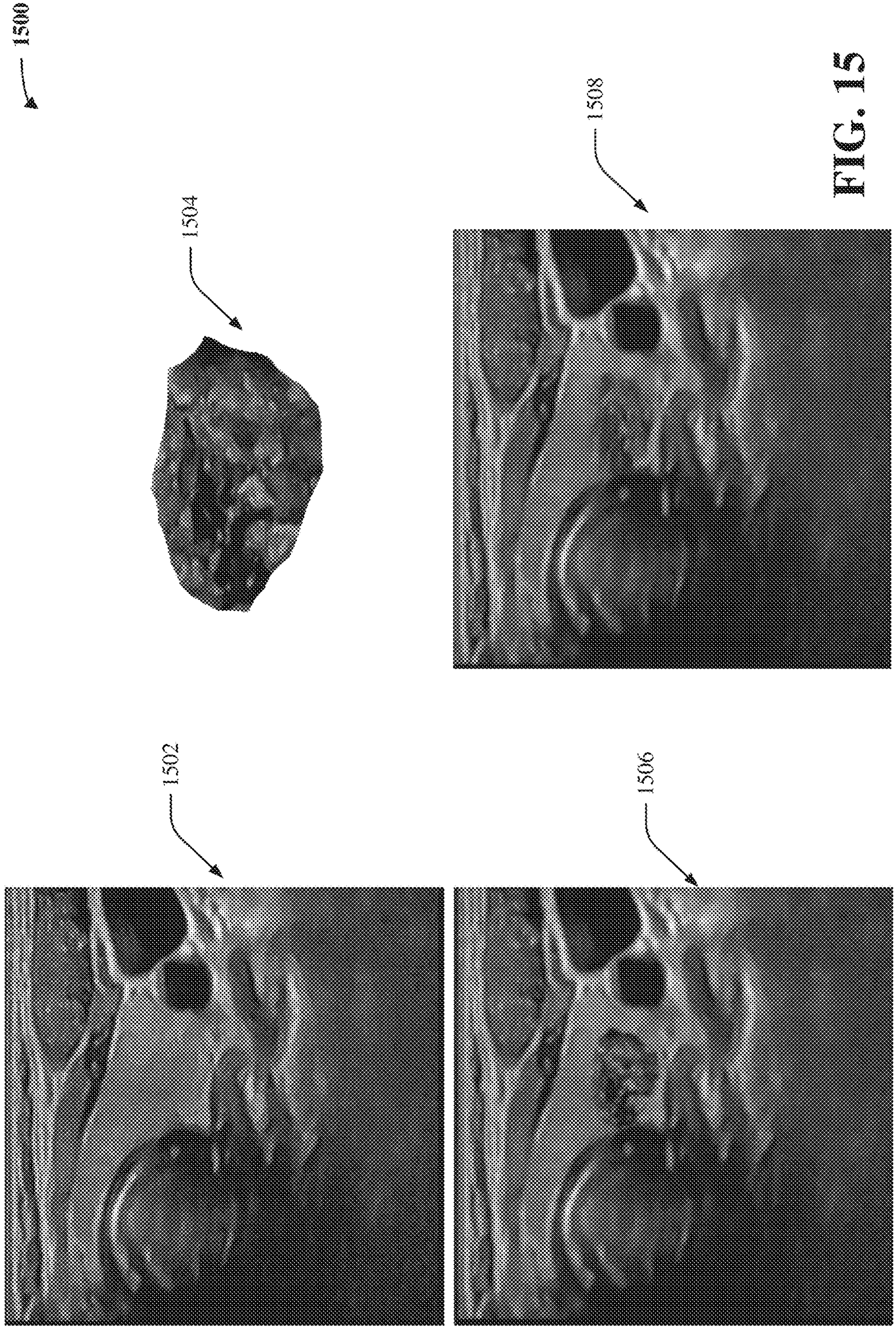

Next, consider FIG. 15, which shows an ultrasound image 1502, a lesion 1504, a pasted image 1506, and a locally-diffused image 1508. The pasted image 1506 was obtained by pasting a down-scaled version of the lesion 1504 into the ultrasound image 1502. The locally-diffused image 1508 was obtained by performing the truncated forward-diffusion process 702 and the truncated reverse-diffusion process 704 on the pasted image 1506, in accordance with FIG. 11. As shown, the locally-diffused image 1508 appears to be much more realistic than the pasted image 1506. Thus, the locally-diffused image 1508 can be considered as a synthetic yet biologically-plausible aberrant version of the ultrasound image 1502.

Figure 16:
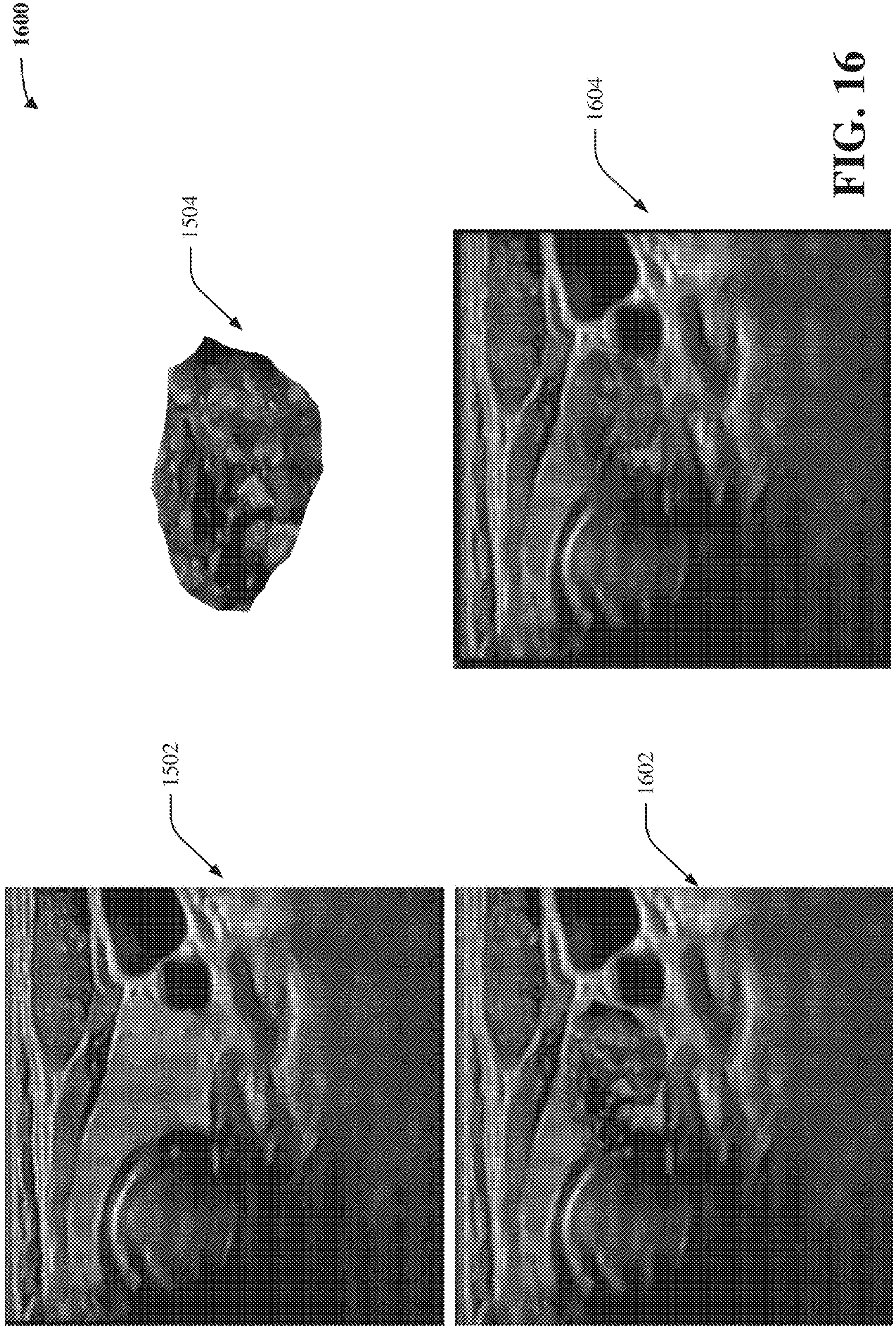

Now, consider FIG. 16, which shows the ultrasound image 1502 and the lesion 1504, as well as a pasted image 1602 and a locally-diffused image 1604. The pasted image 1602 was obtained by pasting the lesion 1404 into the ultrasound image 1402. The locally-diffused image 1604 was obtained by performing the truncated forward-diffusion process 702 and the truncated reverse-diffusion process 704 on the pasted image 1602, in accordance with FIG. 11. As shown, the locally-diffused image 1604 appears to be much more realistic than the pasted image 1602. Thus, the locally-diffused image 1604 can be considered as a synthetic yet biologically-plausible aberrant version of the ultrasound image 1402.

Figure 17:
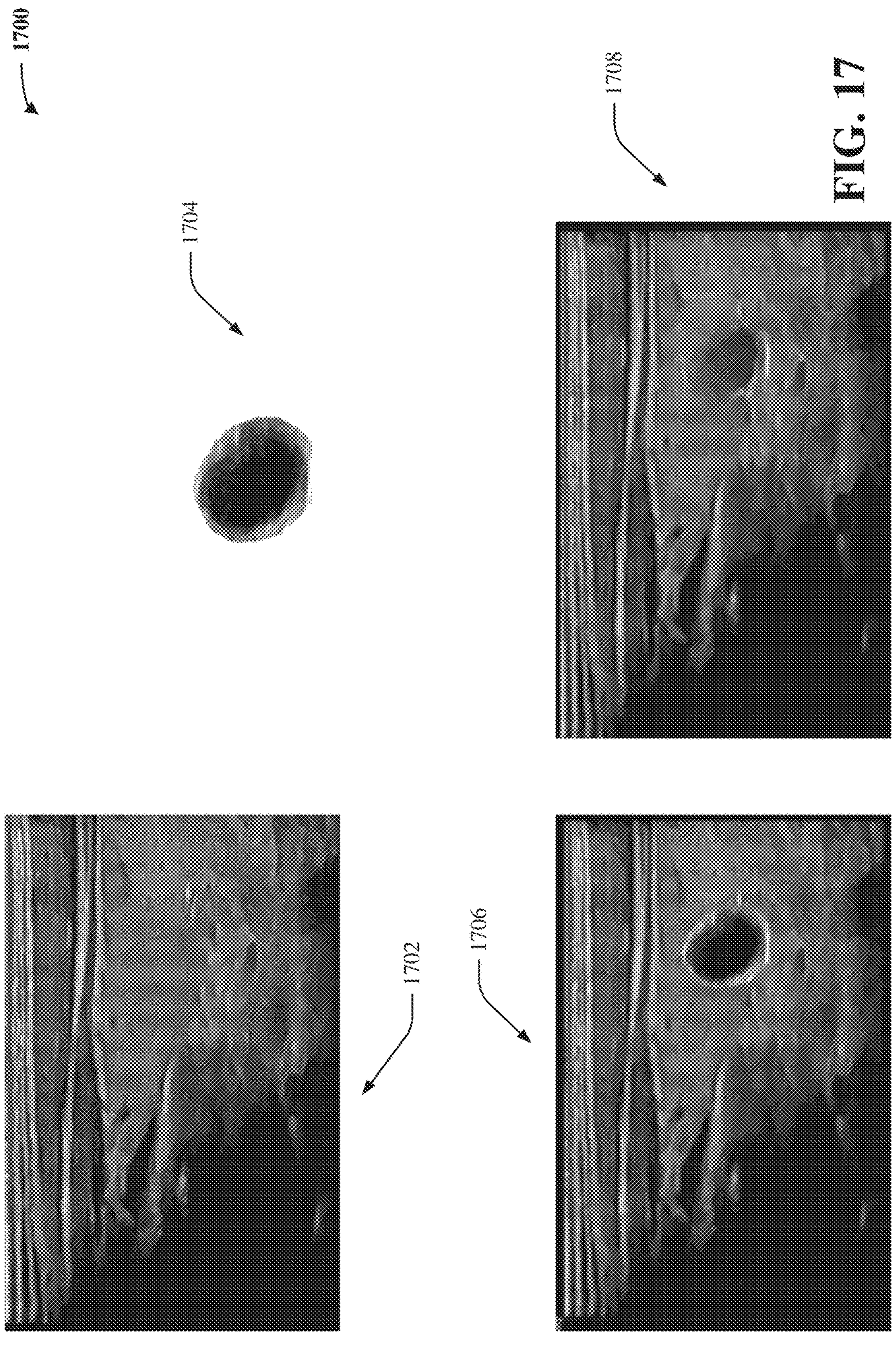

Next, consider FIG. 17, which shows an ultrasound image 1702, a lesion 1704, a pasted image 1706, and a locally-diffused image 1708. The pasted image 1706 was obtained by pasting a down-scaled version of the lesion 1704 into the ultrasound image 1702. The locally-diffused image 1708 was obtained by performing the truncated forward-diffusion process 702 and the truncated reverse-diffusion process 704 on the pasted image 1706, in accordance with FIG. 11. As shown, the locally-diffused image 1708 appears to be much more realistic than the pasted image 1706. Thus, the locally-diffused image 1708 can be considered as a synthetic yet biologically-plausible aberrant version of the ultrasound image 1702.

Figure 18:
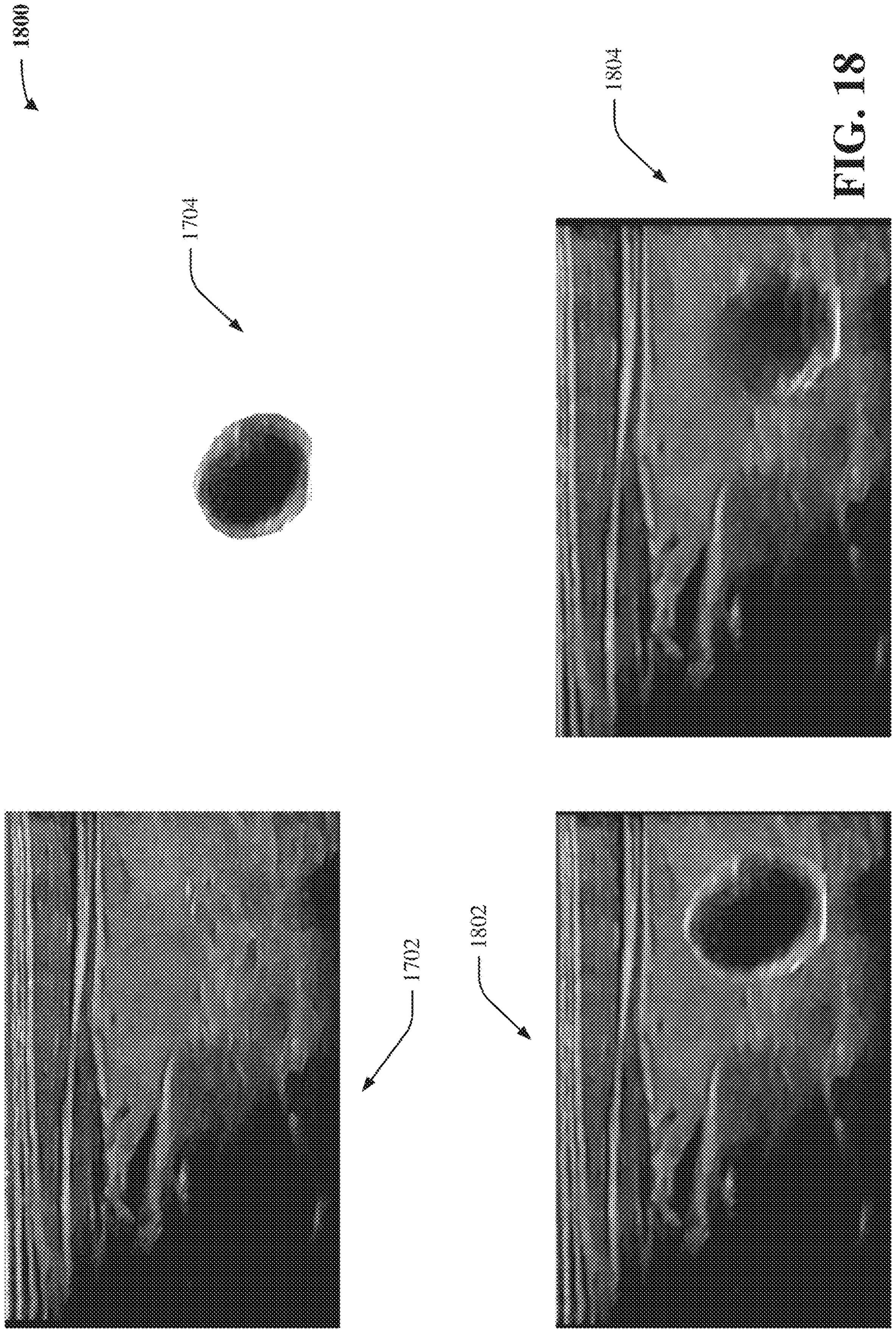

Now, consider FIG. 18, which shows the ultrasound image 1702 and the lesion 1704, as well as a pasted image 1802 and a locally-diffused image 1804. The pasted image 1802 was obtained by pasting an up-scaled version of the lesion 1704 into the ultrasound image 1702. The locally-diffused image 1804 was obtained by performing the truncated forward-diffusion process 702 and the truncated reverse-diffusion process 704 on the pasted image 1802, in accordance with FIG. 11. As shown, the locally-diffused image 1804 appears to be much more realistic than the pasted image 1802. Thus, the locally-diffused image 1804 can be considered as a synthetic yet biologically-plausible aberrant version of the ultrasound image 1702.

Figure 19:
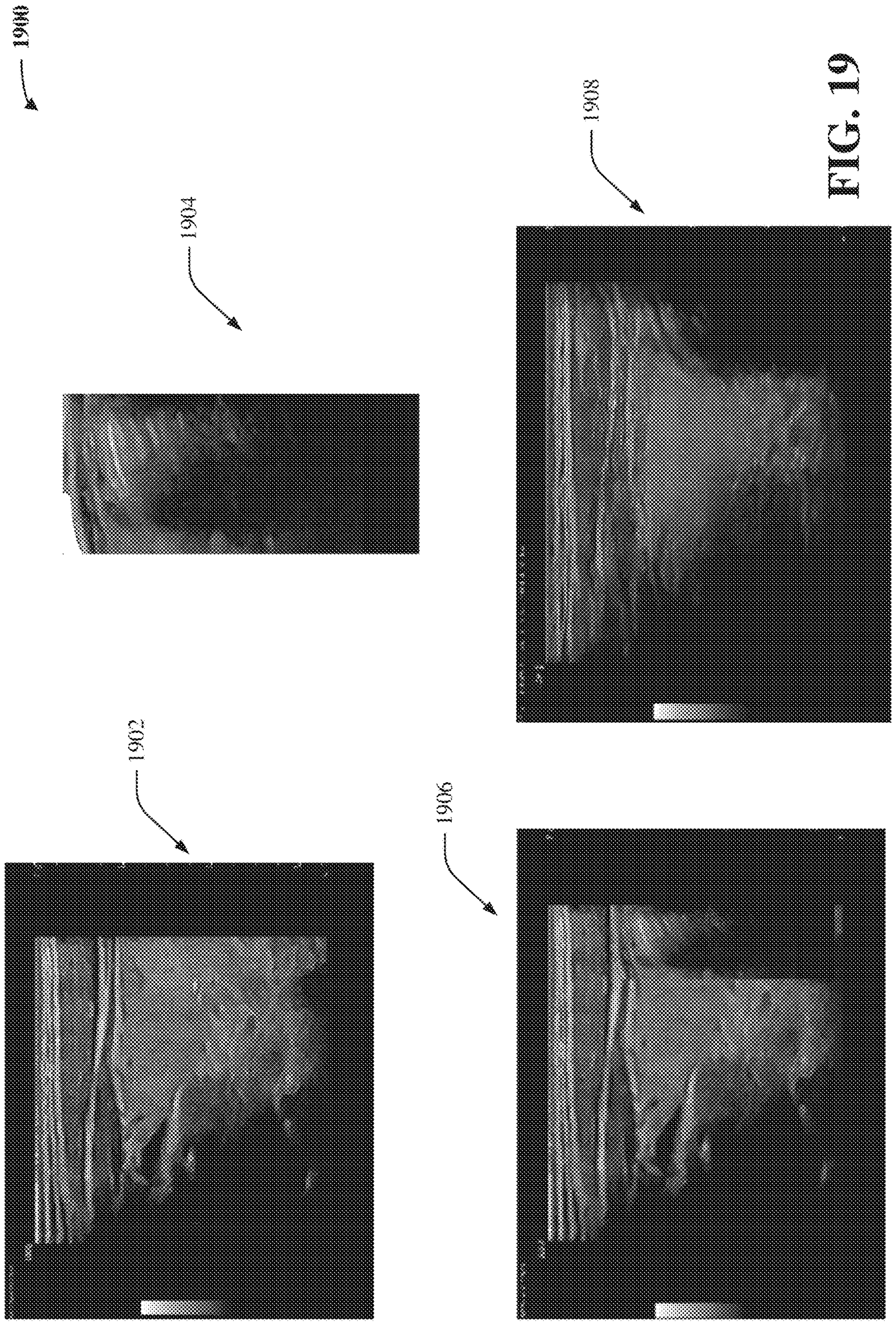

Next, consider FIG. 19, which shows an ultrasound image 1902, a lesion 1904, a pasted image 1906, and a locally-diffused image 1908. The pasted image 1906 was obtained by pasting a down-scaled version of the lesion 1904 into the ultrasound image 1902. The locally-diffused image 1908 was obtained by performing the truncated forward-diffusion process 702 and the truncated reverse-diffusion process 704 on the pasted image 1906, in accordance with FIG. 11. As shown, the locally-diffused image 1908 appears to be much more realistic than the pasted image 1906. Thus, the locally-diffused image 1908 can be considered as a synthetic yet biologically-plausible aberrant version of the ultrasound image 1902.

Figure 20:
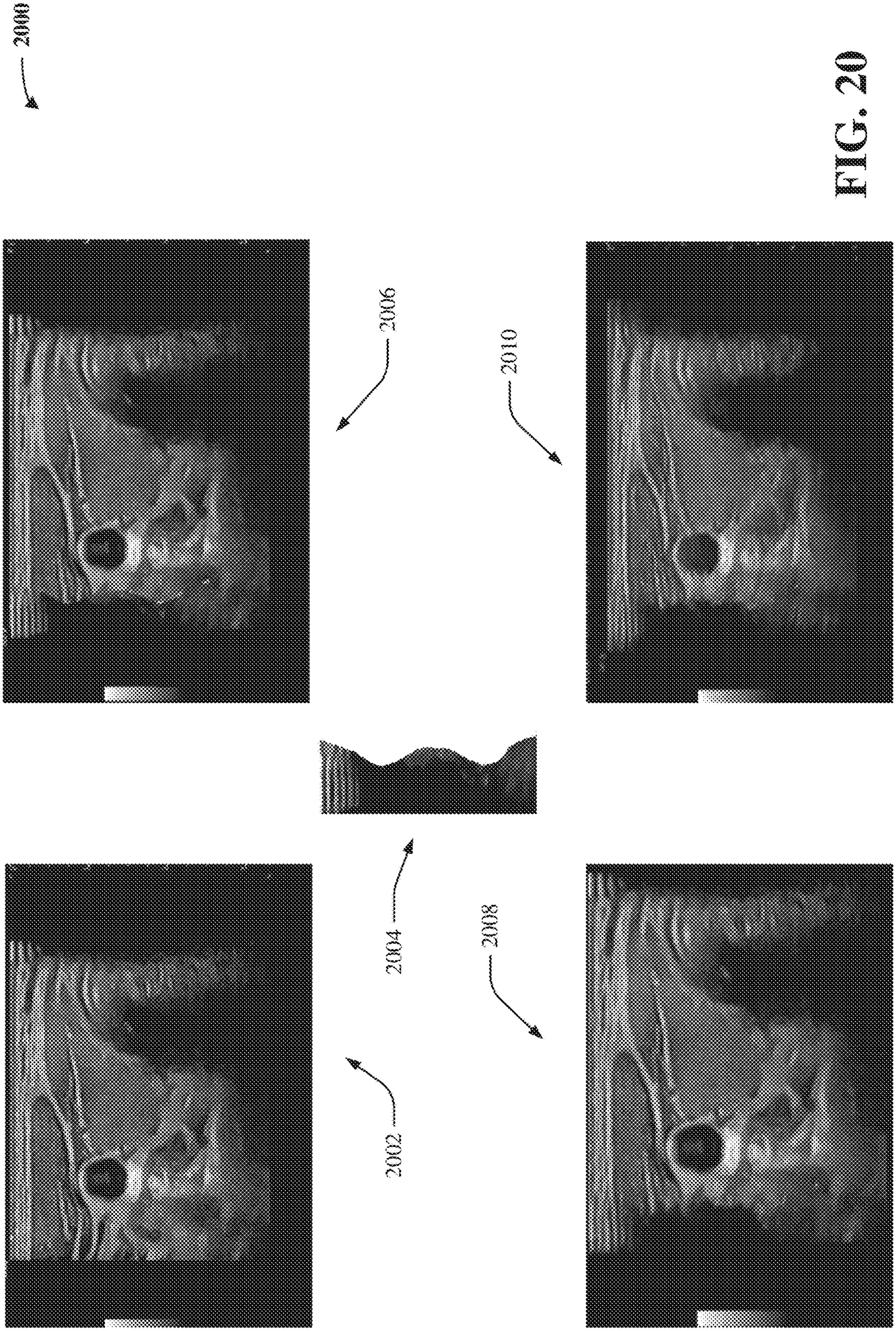

Lastly, consider FIG. 20, which shows an ultrasound image 2002, a lesion 2004, a pasted image 2006, a locally-diffused image 2008, and a fully-diffused image 2010. The pasted image 2006 was obtained by pasting a down-scaled version of the lesion 2004 into the ultrasound image 2002. The locally-diffused image 2008 was obtained by performing the truncated forward-diffusion process 702 and the truncated reverse-diffusion process 704 on the pasted image 1906, in accordance with FIG. 11. The fully-diffused image 2010 was obtained by performing the truncated forward-diffusion process 702 and the truncated reverse-diffusion process 704 on the pasted image 1906, in accordance with FIG. 12. As shown, both the locally-diffused image 2008 and the fully-diffused image 2010 appear to be much more realistic than the pasted image 2006. Thus, the locally-diffused image 2008 and the fully-diffused image 2010 can be considered as synthetic yet biologically-plausible aberrant versions of the ultrasound image 2002.

Note that, in order for the LLM 502 to accurately or reliably select the foreign object 402 or an augmentation for the foreign object 402, the LLM 502 can first undergo training. Non-limiting aspects are described with respect to FIG. 21.

Figure 21:
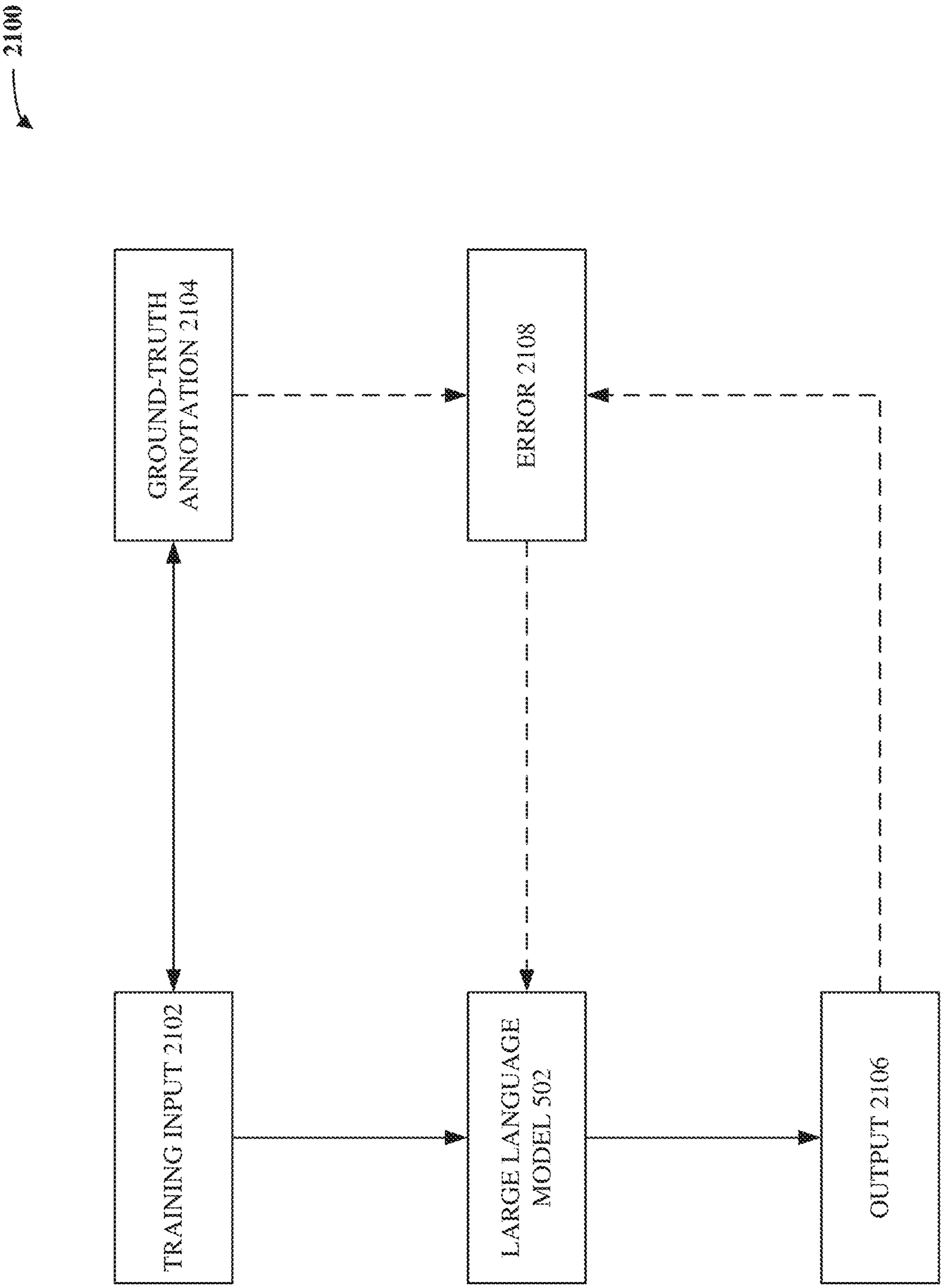
FIG. 21 illustrates an example, non-limiting block diagram showing how a large language model can be trained in accordance with one or more embodiments described herein.

FIG. 21 illustrates an example, non-limiting block diagram 2100 showing how the LLM 502 can be trained in accordance with one or more embodiments described herein.

In various aspects, prior to beginning training, the trainable internal parameters (e.g., convolutional kernels, weight matrices, bias values) of the LLM 502 can be initialized in any suitable fashion (e.g., via random initialization).

In various embodiments, there can be a training input 2102 and a ground-truth annotation 2104. The training input 2102 can be any suitable training text (or a concatenation thereof which any suitable medical images), and the ground-truth annotation 2104 can be whatever correct or accurate synthesized textual content (e.g., correct or accurate foreign object determination; correct or accurate augmentation determination) is known or deemed to correspond to the training input 2102.

In various aspects, the LLM 502 can be executed on the training input 2102, thereby causing the LLM 502 to produce an output 2106. More specifically, the training input 2102 can be fed or routed to the input layer of the LLM 502, the training input 2102 can complete a forward pass through the one or more hidden layers of the LLM 502, and the output layer of the LLM 502 can compute the output 2106 based on activation maps or feature maps provided by the one or more hidden layers of the LLM 502.

Note that the format, size, or dimensionality of the output 2106 can be dictated by the number, arrangement, sizes, or other characteristics of the neurons, convolutional kernels, LSTM layers, or other internal parameters of the output layer (or of any other layers) of the LLM 502. Accordingly, the output 2106 can be forced to have any desired format, size, or dimensionality, by adding, removing, or otherwise adjusting characteristics of the output layer (or of any other layers) of the LLM 502.

In various aspects, the output 2106 can be considered as the predicted or inferred text (e.g., predicted or inferred foreign object determination, predicted or inferred augmentation determination) that the LLM 502 believes should correspond to the training input 2102. Note that, if the LLM 502 has so far undergone no or little training, then the output 2106 can be highly inaccurate. In other words, the output 2106 can be very different from the ground-truth annotation 2104.

In various aspects, an error 2108 (e.g., MAE, MSE, cross-entropy error) between the output 2106 and the ground-truth annotation 2104 can be computed. In various instances, the trainable internal parameters of the LLM 502 can be incrementally updated via backpropagation (e.g., stochastic gradient descent) based on the error 2108.

In various cases, such execution-and-update procedure can be repeated for any suitable number of input-annotation pairs. This can ultimately cause the trainable internal parameters of the LLM 502 to become iteratively optimized for accurately synthesizing text. In various aspects, any suitable training batch sizes, any suitable error/loss functions, or any suitable training termination criteria can be utilized during such training.

Although the herein disclosure mainly describes the LLM 502 as being trained in supervised fashion, this is a mere non-limiting example for ease of explanation and illustration. In various embodiments, any other suitable training paradigms can be used to train the LLM 502, such as unsupervised training or reinforcement learning, any of which may be federated or non-federated.

Figure 22:
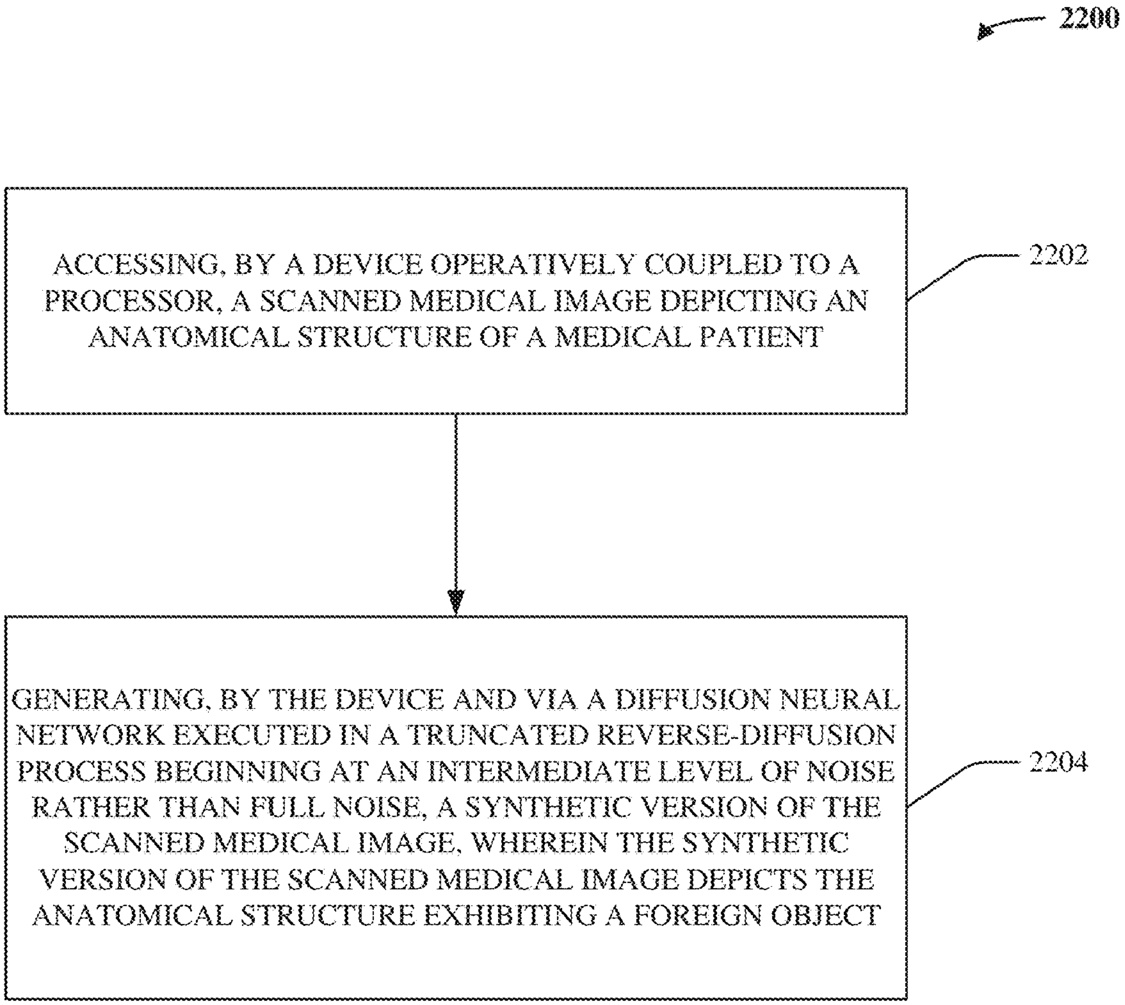
FIG. 22 illustrates a flow diagram of an example, non-limiting computer-implemented method that facilitates aberrant image synthesis via truncated reverse-diffusion in accordance with one or more embodiments described herein.

FIG. 22 illustrates a flow diagram of an example, non-limiting computer-implemented method 2200 that can facilitate aberrant image synthesis via truncated reverse-diffusion in accordance with one or more embodiments described herein. In various cases, the aberrant image synthesis system 102 can facilitate the computer-implemented method 2200.

In various embodiments, act 2202 can include accessing, by a device (e.g., via 112) operatively coupled to a processor (e.g., 108), a scanned medical image (e.g., 104) depicting an anatomical structure (e.g., 106) of a medical patient.

In various aspects, act 2204 can include generating, by the device (e.g., via 118) and via a diffusion neural network (e.g., 202) executed in a truncated reverse-diffusion process (e.g., 704) beginning at an intermediate level of noise (e.g., beginning at 902(*s*)) rather than full noise, a synthetic version (e.g., 706) of the scanned medical image, wherein the synthetic version of the scanned medical image can depict the anatomical structure exhibiting a foreign object (e.g., 402).

Although not explicitly shown in FIG. 22, the computer-implemented method 2200 can comprise: pasting, by the device (e.g., via 118), the foreign object into the scanned medical image, thereby yielding a post-paste image (e.g., 802); iteratively inserting, by the device (e.g., via 118) and via a truncated forward-diffusion process (e.g., 702), noise into the post-paste image, thereby yielding a sequence of progressively-noisier versions (e.g., 902) of the post-paste image, wherein a noisiest version (e.g., 902(*s*)) of the post-paste image in the sequence of progressively-noisier versions of the post-paste image is not full noise; and iteratively executing, by the device (e.g., via 118), the diffusion neural network in the truncated reverse-diffusion process, wherein the truncated reverse-diffusion process begins with the noisiest version of the post-paste image, and wherein a final time-step output (e.g., 1002(0)) of the truncated reverse-diffusion process is the synthetic version of the scanned medical image.

Although not explicitly shown in FIG. 22, the post-paste image can depict one or more pasting artifacts, the one or more pasting artifacts can be not visibly discernible in the noisiest version of the post-paste image, and the anatomical structure and the foreign object can be nevertheless visibly discernible in the noisiest version of the post-paste image.

Although not explicitly shown in FIG. 22, the truncated forward-diffusion process can comprise a fraction of a total number of time-steps (e.g., s≈0.25t) of a forward-diffusion process (e.g., 304) on which the diffusion neural network was trained.

Although not explicitly shown in FIG. 22, the computer-implemented method 2200 can, at a current time-step (e.g., j) of the truncated reverse-diffusion process, comprise: accessing, by the device (e.g., via 118), a first reverse-diffused image (e.g., 1002(*j*)) produced during a previous time-step (e.g., j+1) of the truncated reverse-diffusion process; and executing, by the device, the diffusion neural network on the first reverse-diffused image, thereby producing a second reverse-diffused image (e.g., 1002(*j*−1)) that contains incrementally less noise than the first reverse-diffused image, wherein the second reverse-diffused image is treated as input for the diffusion neural network during a succeeding time-step (e.g., j−1) of the truncated reverse-diffusion process.

Although not explicitly shown in FIG. 22, the computer-implemented method 2200 can comprise: overlaying, by the device (e.g., via 118), a mask (e.g., 804) onto the post-paste image, such that the mask circumscribes the foreign object but does not cover an entirety of the post-paste image; and at a current time-step (e.g., j) of the truncated reverse-diffusion process: accessing, by the device (e.g., via 118), a first reverse-diffused image (e.g., 1002(*j*)) produced during a previous time-step (e.g., j+1) of the truncated reverse-diffusion process; executing, by the device (e.g., via 118), the diffusion neural network on the first reverse-diffused image, thereby producing a second reverse-diffused image (e.g., 1102(*j*−1)) that contains incrementally less noise than the first reverse-diffused image; and replacing, by the device (e.g., via 118), an unmasked portion of the second reverse-diffused image with an unmasked portion of whichever one (e.g., 902(*j*−1)) of the sequence of progressively-noisier versions of the post-paste image corresponds to a succeeding time-step (e.g., j−1) of the truncated reverse-diffusion process, thereby yielding a third reverse-diffused image (e.g., 1002(*j*−1)) that is treated as input for the diffusion neural network during the succeeding time-step.

Although not explicitly shown in FIG. 22, the computer-implemented method 2200 can comprise: selecting, by the device (e.g., via 116) and based on execution of a large language model (e.g., 502), the foreign object from a foreign object library (e.g., 508); or augmenting, by the device (e.g., via 116) and based on execution of the large language model, the foreign object via a geometric or intensity-based transformation (e.g., one of 604).

Although not explicitly shown in FIG. 22, the computer-implemented method 2200 can comprise: training, by the device (e.g., via 120) and on the synthetic version of the scanned medical image, another neural network to perform an inferencing task.

Various embodiments described herein can involve a computer program product for facilitating aberrant image synthesis via truncated reverse-diffusion. In various aspects, the computer program product can comprise a non-transitory computer-readable memory (e.g., 110) having program instructions embodied therewith. In various instances, the program instructions can be executable by a processor (e.g., 108) to cause the processor to: access a scanned medical image (e.g., 104); generate, via a diffusion neural network (e.g., 202) implemented in a truncated reverse-diffusion process (e.g., 704), a pathological version (e.g., 706) of the scanned medical image; and train, on the pathological version of the scanned medical image, another neural network to perform an inferencing task.

Although the herein disclosure mainly describes various embodiments as pasting the foreign object 402 into the medical image 104 to yield the post-paste image 802, these are mere non-limiting examples for ease of illustration and explanation. It should be appreciated and understood that, in various embodiments, the foreign object 402 can be added, inserted, or otherwise integrated (e.g., by the synthesis component 118) into the medical image 104 in any suitable fashion or via any suitable image-editing technique (e.g., not limited to pasting). As a non-limiting example, in some embodiments, the foreign object 402 can be added, inserted, or otherwise integrated into the medical image 104 via any suitable image-blending technique, such as alpha blending. In such case, the post-paste image 802 can be renamed as "post-blend image". Indeed, because the foreign object 402 can be added, inserted, or otherwise integrated into the medical image 104 via any suitable image-editing technique, the post-paste image 802 can be more generally renamed as "post-integration image" or as "post-insertion image". In any case, the foreign object 402 can be inserted or integrated in any suitable fashion into the medical image 104, and the truncated forward-diffusion process 702 and the truncated reverse-diffusion process 704 can accordingly be performed after such insertion or integration, thereby yielding the synthetic medical image 706 (e.g., the truncated forward-diffusion process 702 and the truncated reverse-diffusion process 704 can cause any pasting artifacts or blending artifacts in the post-insertion or post-integration image to be suppressed, reduced, or removed, thereby yielding a synthetic version of the medical image 104 that exhibits the foreign object 402 in a realistic or biologically-plausible way).

It should be appreciated that any of the herein-described embodiments can involve pasting, blending, or otherwise integrating any suitable number of foreign objects into any given medical image (e.g., can paste, blend, or integrate multiple instances of the same foreign object into the given medical image; can paste, blend, or integrate differently augmented instances of the same foreign object into the given medical image; can paste, blend, or integrate different types of foreign objects into the same medical image).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by f(z)=confidence (class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

Figure 23:
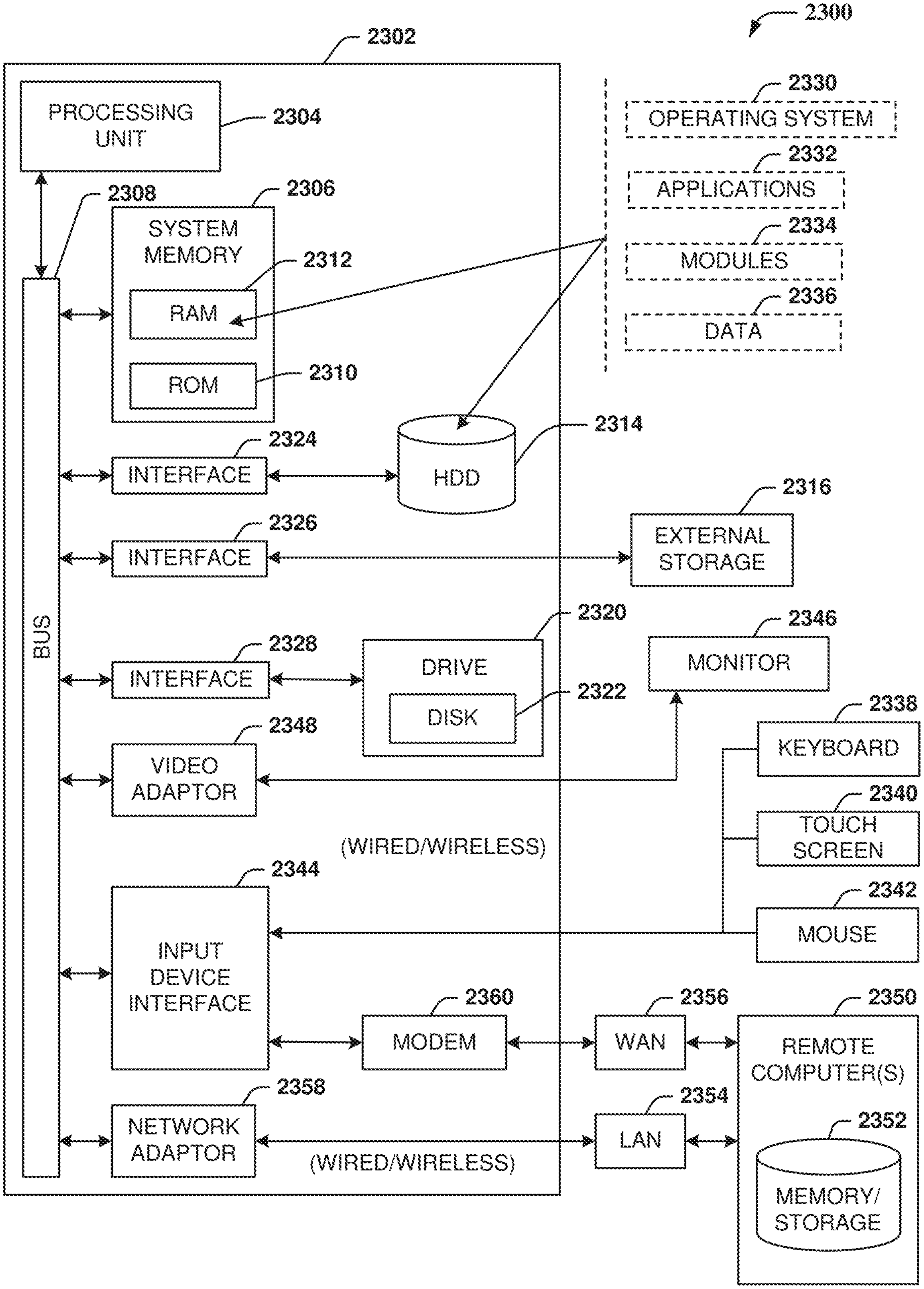
FIG. 23 illustrates a block diagram of an example, non-limiting operating environment in which one or more embodiments described herein can be facilitated.

In order to provide additional context for various embodiments described herein, FIG. 23 and the following discussion are intended to provide a brief, general description of a suitable computing environment 2300 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 23, the example environment 2300 for implementing various embodiments of the aspects described herein includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi-processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes ROM 2310 and RAM 2312. A basic input/output system (BIOS) can be stored in a non-volatile memory such as ROM, erasable programmable read only memory (EPROM), EEPROM, which BIOS contains the basic routines that help to transfer information between elements within the computer 2302, such as during startup. The RAM 2312 can also include a high-speed RAM such as static RAM for caching data.

The computer 2302 further includes an internal hard disk drive (HDD) 2314 (e.g., EIDE, SATA), one or more external storage devices 2316 (e.g., a magnetic floppy disk drive (FDD) 2316, a memory stick or flash drive reader, a memory card reader, etc.) and a drive 2320, e.g., such as a solid state drive, an optical disk drive, which can read or write from a disk 2322, such as a CD-ROM disc, a DVD, a BD, etc. Alternatively, where a solid state drive is involved, disk 2322 would not be included, unless separate. While the internal HDD 2314 is illustrated as located within the computer 2302, the internal HDD 2314 can also be configured for external use in a suitable chassis (not shown). Additionally, while not shown in environment 2300, a solid state drive (SSD) could be used in addition to, or in place of, an HDD 2314. The HDD 2314, external storage device(s) 2316 and drive 2320 can be connected to the system bus 2308 by an HDD interface 2324, an external storage interface 2326 and a drive interface 2328, respectively. The interface 2324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2312, including an operating system 2330, one or more application programs 2332, other program modules 2334 and program data 2336. All or portions of the operating system, applications, modules, or data can also be cached in the RAM 2312. The systems and methods described herein can be implemented utilizing various commercially available operating systems or combinations of operating systems.

Computer 2302 can optionally comprise emulation technologies. For example, a hypervisor (not shown) or other intermediary can emulate a hardware environment for operating system 2330, and the emulated hardware can optionally be different from the hardware illustrated in FIG. 23. In such an embodiment, operating system 2330 can comprise one virtual machine (VM) of multiple VMs hosted at computer 2302. Furthermore, operating system 2330 can provide runtime environments, such as the Java runtime environment or the .NET framework, for applications 2332. Runtime environments are consistent execution environments that allow applications 2332 to run on any operating system that includes the runtime environment. Similarly, operating system 2330 can support containers, and applications 2332 can be in the form of containers, which are lightweight, standalone, executable packages of software that include, e.g., code, runtime, system tools, system libraries and settings for an application.

Further, computer 2302 can be enable with a security module, such as a trusted processing module (TPM). For instance with a TPM, boot components hash next in time boot components, and wait for a match of results to secured values, before loading a next boot component. This process can take place at any layer in the code execution stack of computer 2302, e.g., applied at the application execution level or at the operating system (OS) kernel level, thereby enabling security at any level of code execution.

A user can enter commands and information into the computer 2302 through one or more wired/wireless input devices, e.g., a keyboard 2338, a touch screen 2340, and a pointing device, such as a mouse 2342. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2304 through an input device interface 2344 that can be coupled to the system bus 2308, but can be connected by other interfaces, such as a parallel port, an IEEE 1394 serial port, a game port, a USB port, an IR interface, a BLUETOOTH® interface, etc.

A monitor 2346 or other type of display device can be also connected to the system bus 2308 via an interface, such as a video adapter 2348. In addition to the monitor 2346, a computer typically includes other peripheral output devices (not shown), such as speakers, printers, etc.

The computer 2302 can operate in a networked environment using logical connections via wired or wireless communications to one or more remote computers, such as a remote computer(s) 2350. The remote computer(s) 2350 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2352 is illustrated. The logical connections depicted include wired/wireless connectivity to a local area network (LAN) 2354 or larger networks, e.g., a wide area network (WAN) 2356. Such LAN and WAN networking environments are commonplace in offices and companies, and facilitate enterprise-wide computer networks, such as intranets, all of which can connect to a global communications network, e.g., the Internet.

When used in a LAN networking environment, the computer 2302 can be connected to the local network 2354 through a wired or wireless communication network interface or adapter 2358. The adapter 2358 can facilitate wired or wireless communication to the LAN 2354, which can also include a wireless access point (AP) disposed thereon for communicating with the adapter 2358 in a wireless mode.

When used in a WAN networking environment, the computer 2302 can include a modem 2360 or can be connected to a communications server on the WAN 2356 via other means for establishing communications over the WAN 2356, such as by way of the Internet. The modem 2360, which can be internal or external and a wired or wireless device, can be connected to the system bus 2308 via the input device interface 2344. In a networked environment, program modules depicted relative to the computer 2302 or portions thereof, can be stored in the remote memory/storage device 2352. It will be appreciated that the network connections shown are example and other means of establishing a communications link between the computers can be used.

When used in either a LAN or WAN networking environment, the computer 2302 can access cloud storage systems or other network-based storage systems in addition to, or in place of, external storage devices 2316 as described above, such as but not limited to a network virtual machine providing one or more aspects of storage or processing of information. Generally, a connection between the computer 2302 and a cloud storage system can be established over a LAN 2354 or WAN 2356 e.g., by the adapter 2358 or modem 2360, respectively. Upon connecting the computer 2302 to an associated cloud storage system, the external storage interface 2326 can, with the aid of the adapter 2358 or modem 2360, manage storage provided by the cloud storage system as it would other types of external storage. For instance, the external storage interface 2326 can be configured to provide access to cloud storage sources as if those sources were physically connected to the computer 2302.

The computer 2302 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 24:
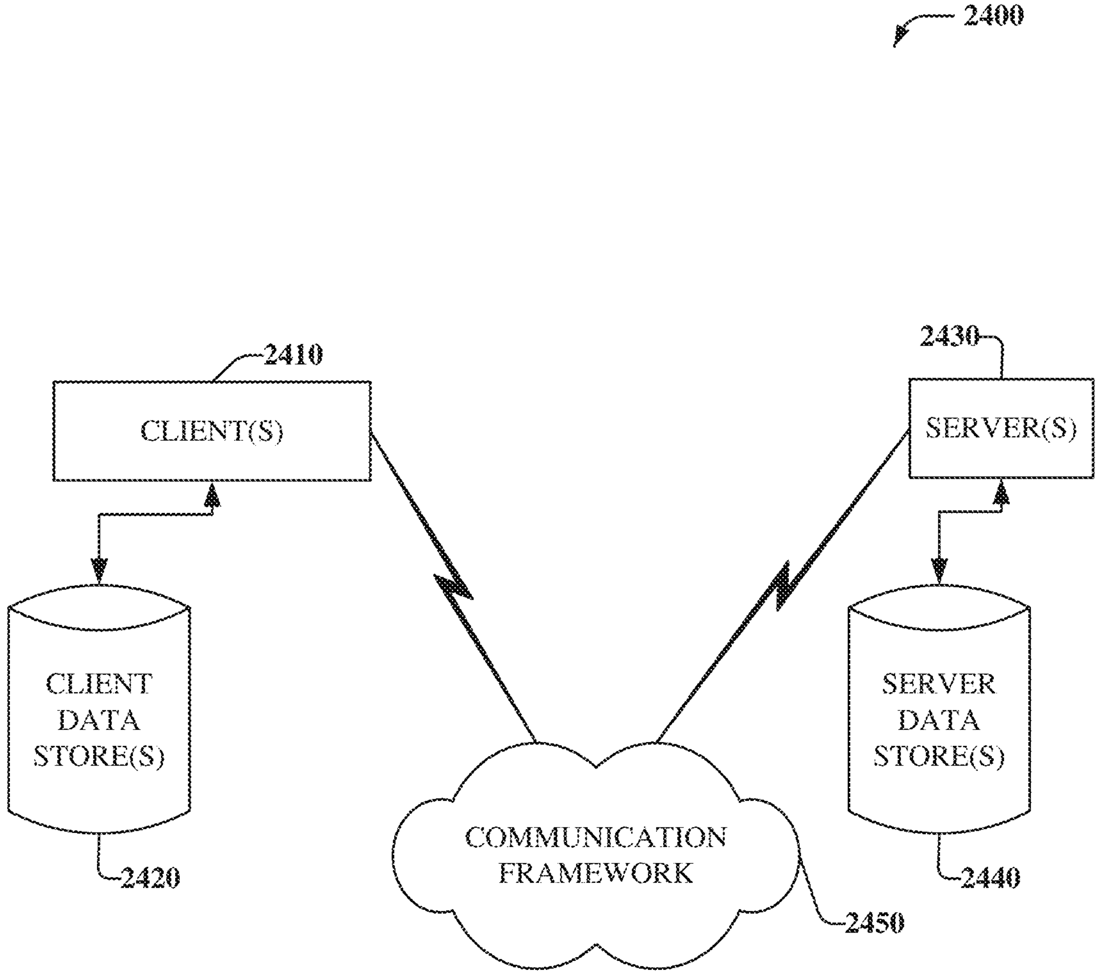
FIG. 24 illustrates an example networking environment operable to execute various implementations described herein.

FIG. 24 is a schematic block diagram of a sample computing environment 2400 with which the disclosed subject matter can interact. The sample computing environment 2400 includes one or more client(s) 2410. The client(s) 2410 can be hardware or software (e.g., threads, processes, computing devices). The sample computing environment 2400 also includes one or more server(s) 2430. The server(s) 2430 can also be hardware or software (e.g., threads, processes, computing devices). The servers 2430 can house threads to perform transformations by employing one or more embodiments as described herein, for example. One possible communication between a client 2410 and a server 2430 can be in the form of a data packet adapted to be transmitted between two or more computer processes. The sample computing environment 2400 includes a communication framework 2450 that can be employed to facilitate communications between the client(s) 2410 and the server(s) 2430. The client(s) 2410 are operably connected to one or more client data store(s) 2420 that can be employed to store information local to the client(s) 2410. Similarly, the server(s) 2430 are operably connected to one or more server data store(s) 2440 that can be employed to store information local to the servers 2430.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a solid state drive such as M.2 (including non-volatile memory express (NVMe) or serial advanced technology attachment (SATA)), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory that stores computer-executable components; and a processor that executes at least one of the computer-executable components that:

accesses a scanned medical image depicting an anatomical structure of a medical patient; and generates, via a diffusion neural network executed in a truncated reverse-diffusion process beginning at an intermediate level of noise rather than full noise, a synthetic version of the scanned medical image, wherein the synthetic version of the scanned medical image depicts the anatomical structure exhibiting a foreign object, wherein the anatomical structure and the foreign object are visibly discernible at the intermediate level of noise.

2. The system of claim 1, wherein the at least one of the computer-executable components further:

pastes or blends the foreign object into the scanned medical image, thereby yielding a post-paste or post-blend image;

iteratively inserts, via a truncated forward-diffusion process, noise into the post-paste or post-blend image, thereby yielding a sequence of progressively-noisier versions of the post-paste or post-blend image, wherein a noisiest version of the post-paste or post-blend image in the sequence of progressively-noisier versions of the post-paste or post-blend image is not full noise; and iteratively executes the diffusion neural network in the truncated reverse-diffusion process, wherein the truncated reverse-diffusion process begins with the noisiest version of the post-paste or post-blend image, and wherein a final time-step output of the truncated reverse-diffusion process is the synthetic version of the scanned medical image.

3. The system of claim 2, wherein the post-paste or post-blend image depicts one or more pasting or blending artifacts, wherein the one or more pasting or blending artifacts are not visibly discernible in the noisiest version of the post-paste or post-blend image, and wherein the anatomical structure and the foreign object are nevertheless visibly discernible in the noisiest version of the post-paste or post-blend image.

4. The system of claim 2, wherein the truncated forward-diffusion process comprises a fraction of a total number of time-steps of a forward-diffusion process on which the diffusion neural network was trained.

5. The system of claim 2, wherein, at a current time-step of the truncated reverse-diffusion process, the at least one of the computer-executable components further:

accesses a first reverse-diffused image produced during a previous time-step of the truncated reverse-diffusion process; and executes the diffusion neural network on the first reverse-diffused image, thereby producing a second reverse-diffused image that contains incrementally less noise than the first reverse-diffused image, wherein the second reverse-diffused image is treated as input for the diffusion neural network during a succeeding time-step of the truncated reverse-diffusion process.

6. The system of claim 2, wherein the at least one of the computer-executable components further:

overlays a mask onto the post-paste or post-blend image, such that the mask circumscribes the foreign object but does not cover an entirety of the post-paste or post-blend image; and at a current time-step of the truncated reverse-diffusion process:

accesses a first reverse-diffused image produced during a previous time-step of the truncated reverse-diffusion process;

executes the diffusion neural network on the first reverse-diffused image, thereby producing a second reverse-diffused image that contains incrementally less noise than the first reverse-diffused image; and replaces an unmasked portion of the second reverse-diffused image with an unmasked portion of whichever one of the sequence of progressively-noisier versions of the post-paste or post-blend image corresponds to a succeeding time-step of the truncated reverse-diffusion process, thereby yielding a third reverse-diffused image that is treated as input for the diffusion neural network during the succeeding time-step.

7. The system of claim 1, wherein the at least one of the computer-executable components further:

at least one of:

selects, based on execution of a large language model, the foreign object from a foreign object library; or augments, based on execution of the large language model, the foreign object via a geometric or intensity-based transformation.

8. The system of claim 1, wherein the at least one of the computer-executable components further:

trains, on the synthetic version of the scanned medical image, another neural network to perform an inferencing task.

9. The system of claim 1, wherein the foreign object is a cyst, a lesion, a surgical implant, or an imaging artifact.

10. A computer-implemented method, comprising:

accessing, by a device operatively coupled to a processor, a scanned medical image depicting an anatomical structure of a medical patient; and generating, by the device and via a diffusion neural network executed in a truncated reverse-diffusion process beginning at an intermediate level of noise rather than full noise, a synthetic version of the scanned medical image, wherein the synthetic version of the scanned medical image depicts the anatomical structure exhibiting a foreign object, wherein the anatomical structure and the foreign object are visibly discernible at the intermediate level of noise.

11. The computer-implemented method of claim 10, wherein the generating comprises:

pasting or blending, by the device, the foreign object into the scanned medical image, thereby yielding a post-paste or post-blend image;

iteratively inserting, by the device and via a truncated forward-diffusion process, noise into the post-paste or post-blend image, thereby yielding a sequence of progressively-noisier versions of the post-paste or post-blend image, wherein a noisiest version of the post-paste or post-blend image in the sequence of progressively-noisier versions of the post-paste or post-blend image is not full noise; and iteratively executing, by the device, the diffusion neural network in the truncated reverse-diffusion process, wherein the truncated reverse-diffusion process begins with the noisiest version of the post-paste or post-blend image, and wherein a final time-step output of the truncated reverse-diffusion process is the synthetic version of the scanned medical image.

12. The computer-implemented method of claim 11, wherein the post-paste or post-blend image depicts one or more pasting or blending artifacts, wherein the one or more pasting or blending artifacts are not visibly discernible in the noisiest version of the post-paste or post-blend image, and wherein the anatomical structure and the foreign object are nevertheless visibly discernible in the noisiest version of the post-paste or post-blend image.

13. The computer-implemented method of claim 11, wherein the truncated forward-diffusion process comprises a fraction of a total number of time-steps of a forward-diffusion process on which the diffusion neural network was trained.

14. The computer-implemented method of claim 11, further comprising, at a current time-step of the truncated reverse-diffusion process:

accessing, by the device, a first reverse-diffused image produced during a previous time-step of the truncated reverse-diffusion process; and executing, by the device, the diffusion neural network on the first reverse-diffused image, thereby producing a second reverse-diffused image that contains incrementally less noise than the first reverse-diffused image, wherein the second reverse-diffused image is treated as input for the diffusion neural network during a succeeding time-step of the truncated reverse-diffusion process.

15. The computer-implemented method of claim 11, further comprising:

overlaying, by the device, a mask onto the post-paste or post-blend image, such that the mask circumscribes the foreign object but does not cover an entirety of the post-paste or post-blend image; and at a current time-step of the truncated reverse-diffusion process:

accessing, by the device, a first reverse-diffused image produced during a previous time-step of the truncated reverse-diffusion process;

executing, by the device, the diffusion neural network on the first reverse-diffused image, thereby producing a second reverse-diffused image that contains incrementally less noise than the first reverse-diffused image; and replacing, by the device, an unmasked portion of the second reverse-diffused image with an unmasked portion of whichever one of the sequence of progressively-noisier versions of the post-paste or post-blend image corresponds to a succeeding time-step of the truncated reverse-diffusion process, thereby yielding a third reverse-diffused image that is treated as input for the diffusion neural network during the succeeding time-step.

16. The computer-implemented method of claim 10, further comprising:

selecting, by the device and based on execution of a large language model, the foreign object from a foreign object library; or augmenting, by the device and based on execution of the large language model, the foreign object via a geometric or intensity-based transformation.

17. The computer-implemented method of claim 10, further comprising:

training, by the device and on the synthetic version of the scanned medical image, another neural network to perform an inferencing task.

18. The computer-implemented method of claim 10, wherein the foreign object is a cyst, a lesion, a surgical implant, or an imaging artifact.

19. A computer program product for facilitating aberrant image synthesis via truncated reverse-diffusion, the computer program product comprising a non-transitory computer-readable memory having program instructions embodied therewith, the program instructions executable by a processor to cause the processor to:

access a scanned medical image depicting an anatomical structure of a medical patient;

generate, via a diffusion neural network implemented in a truncated reverse-diffusion process beginning at an intermediate level of noise rather than full noise, a pathological version of the scanned medical image, wherein the anatomical structure is visibly discernible at the intermediate level of noise; and train, on the pathological version of the scanned medical image, another neural network to perform an inferencing task.

20. The computer program product of claim 19, wherein the processor generates the pathological version of the scanned medical image by:

pasting or blending a foreign object into the scanned medical image, thereby yielding a post-paste or post-blend image;

iteratively inserting, via a truncated forward-diffusion process, noise into the post-paste or post-blend image, thereby yielding a sequence of progressively-noisier versions of the post-paste or post-blend image, wherein a noisiest version of the post-paste or post-blend image in the sequence of progressively-noisier versions of the post-paste or post-blend image is not full noise; and iteratively executing the diffusion neural network in the truncated reverse-diffusion process, wherein the truncated reverse-diffusion process begins with the noisiest version of the post-paste or post-blend image, and wherein a final time-step output of the truncated reverse-diffusion process is the pathological version of the scanned medical image.

* * * * *